(12) United States Patent
Maie et al.

(10) Patent No.: US 10,860,960 B2
(45) Date of Patent: Dec. 8, 2020

(54) PROJECT SUPPORT SYSTEM AND METHOD

(71) Applicant: Hitachi, Ltd., Tokyo (JP)

(72) Inventors: Yuko Maie, Tokyo (JP); Natsuko Sugaya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 232 days.

(21) Appl. No.: 16/122,923

(22) Filed: Sep. 6, 2018

(65) Prior Publication Data

US 2019/0205803 A1 Jul. 4, 2019

(30) Foreign Application Priority Data

Dec. 28, 2017 (JP) ................................ 2017-255026

(51) Int. Cl.
*G06Q 10/06* (2012.01)
*G06F 1/16* (2006.01)

(52) U.S. Cl.
CPC ....... *G06Q 10/06313* (2013.01); *G06F 1/163* (2013.01)

(58) Field of Classification Search
None
See application file for complete search history.

(56) References Cited

U.S. PATENT DOCUMENTS

| | | | | |
|---|---|---|---|---|
| 2012/0296919 A1* | 11/2012 | Sinha | ................... | H04L 67/327 707/749 |
| 2014/0379292 A1 | 12/2014 | Ara et al. | | |
| 2015/0170674 A1 | 6/2015 | Ishibashi | | |
| 2017/0103357 A1* | 4/2017 | Numata | ........... | G06Q 10/06316 |
| 2017/0337287 A1* | 11/2017 | Gill | ...................... | G06F 16/9537 |
| 2017/0365149 A1* | 12/2017 | Ten Kate | .............. | A61B 5/1118 |

FOREIGN PATENT DOCUMENTS

| | | |
|---|---|---|
| JP | 2007-213475 A | 8/2007 |
| JP | 2008-210363 A | 9/2008 |
| JP | 2009-059075 A | 3/2009 |
| JP | 5588563 B2 | 9/2014 |
| JP | 2015-118185 A | 6/2015 |

OTHER PUBLICATIONS

Japanese Office Action received in corresponding Japanese Application No. 2017-255026 dated Oct. 1, 2019.

* cited by examiner

*Primary Examiner* — Thomas L Mansfield
(74) *Attorney, Agent, or Firm* — Mattingly & Malur, PC

(57) ABSTRACT

A project support system supports the smooth operation of a project. For each predetermined unit that a project comprises, a model case which prescribes a target for each consensus-building task, and an ideal execution time and execution method for each of the consensus-building tasks based on the performance of each consensus-building task executed in a previous project is generated. A consensus building plan which prescribes, for each of the predetermined units, a target, an execution time and an execution method for each of the consensus-building tasks which are to be executed in a current project based on information of the current project and the corresponding model case is generated.

10 Claims, 30 Drawing Sheets

FIG.4

PJ TYPE MANAGEMENT TABLE 16

| PJ TYPE ID | PJ TYPE NAME | CATEGORY | BUDGET SCALE |
|---|---|---|---|
| 1 | BIG DATA ANALYSIS SERVICES | VISUAL-IZATION | 1,000,000 OR LARGER SMALLER THAN 5,000,000 |
| 2 | BIG DATA ANALYSIS SERVICES | AI ANALYSIS | 5,000,000 OR LARGER SMALLER THAN 10,000,000 |
| 3 | DATA ANALYSIS CONSULTING | AI ANALYSIS | 10,000,000 OR LARGER SMALLER THAN 15,000,000 |
| 4 | BIG DATA ANALYSIS SERVICES | AI ANALYSIS | 1,000,000 OR LARGER SMALLER THAN 5,000,000 |
| ... | ... | ... | ... |
| 16A | 16B | 16C | 16D |

FIG.5

OPERATION CONTENT MANAGEMENT TABLE 17

| PJ TYPE ID | OPERATION ID | PROCESS | OPERATION CONTENT | RESPONSIBILITY |
|---|---|---|---|---|
| 1 | W01 | DEFINITION OF REQUIREMENTS | GOAL SETTING | PJ MANAGEMENT |
| 1 | W02 | DEFINITION OF REQUIREMENTS | ANALYSIS ITEM CONFIGURATION | ANALYSIS |
| 1 | X01 | MEASUREMENT PREPARATION | USER BRIEFING | CUSTOMER OFFICE |
| 1 | X02 | MEASUREMENT PREPARATION | EQUIPMENT INSTALLATION | EQUIPMENT PROVISION |
| ... | ... | ... | ... | ... |

PJ RESPONSIBLE PARTY MANAGEMENT TABLE 18

| RESPONSIBLE PARTY ID | RESPONSIBLE PARTY NAME | JOB TITLE | ROLE | COMPANY | DEPARTMENT | SECTION | LOCATION |
|---|---|---|---|---|---|---|---|
| 001 | YAMADA TAROU | DIRECTOR | PJ MANAGEMENT | ...ELECTRIC | DEPARTMENT A | SECTION A1 | SHINAGAWA |
| 002 | SATO KAYO | REPRE- SENTATIVE | ANALYSIS | ...ELECTRIC | DEPARTMENT B | SECTION B1 | OMORI |
| 003 | SUZUKI AKIRA | DEPARTMENT HEAD | EQUIPMENT PROVISION | ...ELECTRIC | DEPARTMENT C | SECTION C1 | OMORI |
| 004 | KATOU MICHIKO | DEPARTMENT HEAD | CUSTOMER OFFICE | ...CHEMICALS | DEPARTMENT D | SECTION D1 | YOKOHAMA |
| ... | ... | ... | ... | ... | ... | ... | ... |
| 18A | 18B | 18C | 18D | 18E | 18F | 18G | 18H |

FIG.7

PJ INFORMATION MANAGEMENT TABLE 19

| SUB-JECT ID | PJ TYPE ID | PROCESS 1 ||| ... |
| | | PROCESS NAME | OPERATION PERIOD | RESPONSIBLE PARTY / ROLE | ... |
|---|---|---|---|---|---|
| 1 | 1 | DEFINITION OF REQUIRE-MENTS | 2017/11/01 ~ 2017/11/05 | YAMADA TAROU – PJ MANAGEMENT SATO KAYO – ANALYSIS ... | ... |
| ... | ... | ... | ... | ... | ... |

SCHEDULE INFORMATION MANAGEMENT TABLE 20

| DATE | TIME | RESPONSIBLE PARTY 001 | RESPONSIBLE PARTY 002 | RESPONSIBLE PARTY 003 | RESPONSIBLE PARTY 004 | ... |
|---|---|---|---|---|---|---|
| 2017/11/01 | 10:00 | Null | 1 | Null | 1 | ... |
| 2017/11/01 | 10:15 | Null | 1 | Null | 1 | ... |
| 2017/11/01 | 10:30 | Null | 1 | 2 | 1 | ... |
| 2017/11/01 | 10:45 | Null | Null | 2 | Null | ... |
| 2017/11/01 | 11:00 | Null | Null | 2 | 2 | ... |
| ... | ... | ... | ... | ... | ... | ... |
| 20A | 20B | 20C | 20C | 20C | 20C | 20C |

FIG.9

CONSENSUS-BUILDING PLAN MANAGEMENT TABLE 21

| SUBJECT ID | OPERATION ID | DATE | START TIME | END TIME | EXECUTION METHOD | CONSENSUS-BUILDING TARGET RESPONSIBLE PARTY | CONVERSATION ROLE |
|---|---|---|---|---|---|---|---|
| 1 | W01 | 2017/11/01 | Null | Null | EMAIL | 002 | Null |
| 1 | W01 | 2017/11/01 | 15:00 | 15:30 | INDIVIDUAL CONSULTATION | 003 | SPEAKER |
| 1 | W01 | 2017/11/02 | 13:00 | 14:00 | BUSINESS MEETING | 002 | Null |
| 1 | W02 | 2017/11/03 | Null | Null | PHONE CALL | 004 | Null |
| 1 | W03 | 2017/11/05 | Null | Null | Null | Null | Null |
| 1 | X02 | 2017/11/08 | 10:00 | 11:00 | BUSINESS MEETING | 004 | Null |
| ... | ... | ... | ... | ... | ... | ... | ... |
| 21A | 21B | 21C | 21D | 21E | 21F | 21G | 21H |

FIG.10

CONSENSUS-BUILDING PERFORMANCE MANAGEMENT TABLE 22

| SUB-JECT ID | OPER-ATION ID | DATE | START TIME | END TIME | EXECUTION METHOD | CONSENSUS-BUILDING TARGET RESPONSIBLE PARTY | INTER-ACTION TIME RATIO | SPEAKER TIME RATIO | LISTENER TIME RATIO |
|---|---|---|---|---|---|---|---|---|---|
| 1 | W01 | 2017/11/01 | 13:00 | Null | EMAIL | 002 | Null | Null | Null |
| 1 | W01 | 2017/11/01 | 15:00 | 15:45 | INDIVIDUAL CONSULTATION | 003 | 0.1 | 0.6 | 0.3 |
| 1 | W01 | 2017/11/02 | 13:00 | 14:00 | BUSINESS MEETING | 002 | Null | Null | Null |
| 1 | W02 | 2017/11/03 | 15:00 | 15:10 | PHONE CALL | 004 | Null | Null | Null |
| ... | ... | ... | ... | ... | ... | ... | ... | ... | ... |
| 22A | 22B | 22C | 22D | 22E | 22F | 22G | 22H | 22I | 22J |

FIG.11

PROCESS PERFORMANCE MANAGEMENT TABLE 23

| SUBJECT ID | PROCESS | OPERATION ID | START DATE | END DATE | DELAY (0: NONE, 1: EXISTS) |
|---|---|---|---|---|---|
| 1 | DEFINITION OF REQUIRE-MENTS | W01 | 2017/11/01 | 2017/11/02 | 0 |
| 1 | DEFINITION OF REQUIRE-MENTS | W02 | 2017/11/03 | 2017/11/03 | 0 |
| 1 | DEFINITION OF REQUIRE-MENTS | W03 | 2017/11/04 | 2017/11/04 | 0 |
| 2 | DEFINITION OF REQUIRE-MENTS | W01 | 2017/11/02 | 2017/12/09 | 1 |
| 3 | DEFINITION OF REQUIRE-MENTS | W01 | 2017/11/18 | 2018/01/25 | 0 |
| ... | ... | ... | ... | ... | ... |
| 23A | 23B | 23C | 23D | 23E | 23F |

FIG.12

CONVERSATION PERFORMANCE MANAGEMENT TABLE 24

| SUBJECT ID | OPERATION ID | CONSENSUS-BUILDING TARGET RESPONSIBLE PARTY | INTER-ACTION TIME RATIO | SPEAKER TIME RATIO | LISTENER TIME RATIO | TOTAL TIME (MINUTES) |
|---|---|---|---|---|---|---|
| 1 | W01 | 003 | 0.1 | 0.6 | 0.3 | 45 |
| 2 | W01 | 002 | 0.4 | 0.3 | 0.3 | 60 |
| 3 | W02 | 004 | 0.6 | 0.1 | 0.3 | 30 |
| ... | ... | ... | ... | ... | ... | ... |

PREVIOUS PERFORMANCE MANAGEMENT TABLE 25

| SUBJECT ID | OPERATION ID | START DATE | EXECUTION METHOD | ROLE OF CONSENSUS-BUILDING TARGET RESPONSIBLE PARTY |
|---|---|---|---|---|
| 1 | W01 | 2017/11/01 | EMAIL | ANALYSIS |
| 1 | W01 | 2017/11/01 | INDIVIDUAL CONSULTATION | EQUIPMENT PROVISION |
| 1 | W01 | 2017/11/02 | BUSINESS MEETING | ANALYSIS |
| 1 | W02 | 2017/11/03 | PHONE CALL | EQUIPMENT PROVISION |
| ... | ... | ... | ... | ... |
| 25A | 25B | 25C | 25D | 25E |

FIG.14

MODEL CASE MANAGEMENT TABLE 26

| PJ TYPE ID | OPERATION ID | PROGRESS RATIO | EXECUTION METHOD | ROLE OF CONSENSUS-BUILDING TARGET RESPONSIBLE PARTY | CONVERSATION TIME (MINUTES) | CONVERSATION ROLE |
|---|---|---|---|---|---|---|
| 5 | W01 | 0.09 | EMAIL | CUSTOMER OFFICE | Null | Null |
| 5 | W01 | 0.18 | BUSINESS MEETING | ANALYSIS | Null | Null |
| 5 | W02 | 0.36 | EMAIL | EQUIPMENT PROVISION | Null | Null |
| 5 | W03 | 0.81 | INDIVIDUAL CONSULTATION | EQUIPMENT PROVISION | 30 | SPEAKER |
| ... | ... | ... | ... | ... | ... | ... |
| 26A | 26B | 26C | 26D | 26E | 26F | 26G |

FIG.16

RESPONSIBLE PARTY INFORMATION INPUT
(PJ RESPONSIBLE PARTY INFORMATION) — 70

70A:
- YAMADA TAROU | SEARCH — 71A, 71B
- FULL NAME: YAMADA TAROU (DIRECTOR)
- PLACE OF WORK: ....ELECTRIC CORP., DEPARTMENT A, SECTION A
- LOCATION: SHINAGAWA
- JOB TITLE: DIRECTOR
- ROLE: PJ MANAGEMENT ▼ — 72A, 72B

[ADDITIONAL INPUT FIELDS]

70B:
- FULL NAME: — 73
- PLACE OF WORK: — 74
- LOCATION: — 75
- JOB TITLE: — 76
- ROLE: ▼ — 77A, 77B
- INPUT — 78

FIG.18

CONSENSUS-BUILDING PERFORMANCE INPUT

◇ PLAN
 TARGET PERSON: SATO KAYO
 DATE & TIME: 7/1
 EXECUTION METHOD: EMAIL
 OPERATION CONTENT: GOAL SETTING

◇ PERFORMANCE

| | | |
|---|---|---|
| TARGET PERSON | SATO KAYO | ▼ |
| DATE | 7/1 | ▼ |
| START TIME | 13:00 | ▼ |
| END TIME | | ▼ |
| EXECUTION METHOD | EMAIL | ▼ |
| OPERATION CONTENT | GOAL SETTING | ▼ |

INPUT

FIG.24

| EXECUTION METHOD | LOCATION | TIME | NUMBER OF PARTICIPANTS | LOCATION | CATEGORY | EXECUTION DIFFICULTY LEVEL |
|---|---|---|---|---|---|---|
| BUSINESS MEETING | ○ | ○ | ○ | ○ | CONVERSATION | 5 |
| TV CONFERENCE | ○ | ○ | ○ | × | CONVERSATION | 4 |
| INDIVIDUAL CONSULTATION | × | ○ | × | ○ | CONVERSATION | 3 |
| PHONE CALL | × | ○ | × | × | CONVERSATION | 2 |
| EMAIL | × | × | × | × | NON-CONVERSATION | 0 |

FIG.27

| SUBJECT ID | PROCESS START DATE | W01 | W02 | W03 | WHOLE PROCESS |
|---|---|---|---|---|---|
| 1 | 2017/11/01 | 3 | 4 | 7 | 14 |
| 3 | 2017/12/06 | 2 | 6 | 7 | 15 |
| 5 | 2017/12/23 | 2 | 5 | 4 | 11 |

FIG.28

| W01 | | W02 | W03 |
|---|---|---|---|
| CUSTOMER OFFICE EMAIL | ANALYSIS BUSINESS MEETING | EQUIPMENT PROVISION EMAIL | EQUIPMENT PROVISION EMAIL |
| PROGRESS RATIO 0.09 | 0.18 | 0.36 | 0.81 |

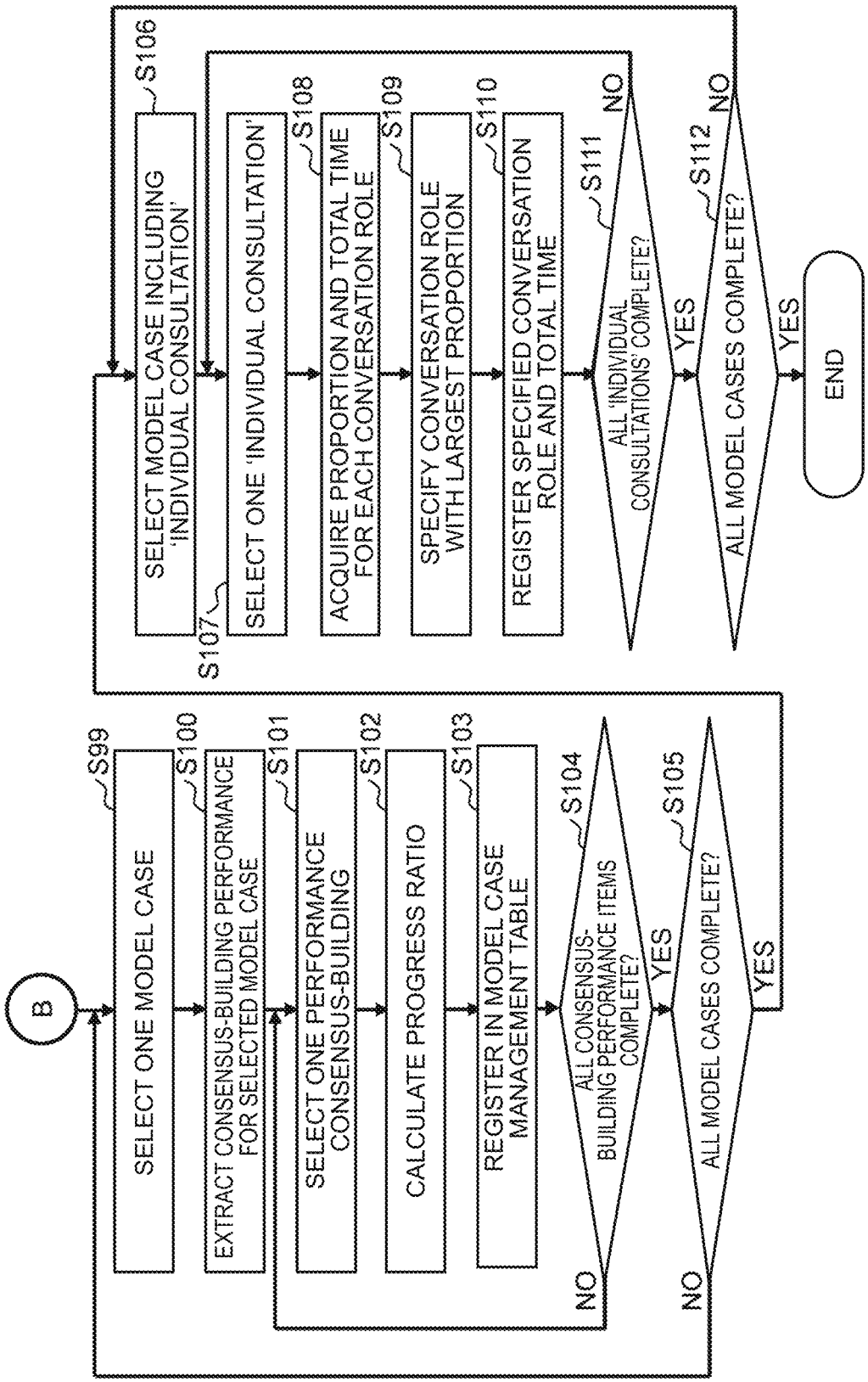

PROJECT SUPPORT SYSTEM AND METHOD

CROSS-REFERENCE TO PRIOR APPLICATION

This application relates to and claims the benefit of priority from Japanese Patent Application number 2017-255026, filed on Dec. 28, 2017 the entire disclosure of which is incorporated herein by reference.

BACKGROUND

The present invention generally relates to a project support system and method, and, more particularly, can be suitably applied to a project support apparatus which supports the execution of a project which includes 'background work' as consensus-building tasks that are to be carried out.

In the field of task management, an awareness of the current state of progress based on operation planning and performance and individual schedules, as well as schedule adjustments are essential, and technologies focused on providing such support have been established.

For example, PTL 1 discloses a work flow operation support system which is devised such that, for a project which is configured from a plurality of operation units and includes a series of operations where it is not possible to advance to the next operation unit unless a first operation unit has ended, a workflow that includes operation content and an operation deadline for each operation is created and managed, and when the progress of any operation is delayed, the workflow is amended so that the work deadline is respected, and an instruction to the responsible party is issued according to a new, post-amendment workflow.

[PTL 1] Japanese Laid-Open Patent Application Publication No. 2007/213475

SUMMARY

Incidentally, in various projects which are executed by businesses and the like, consensus-building tasks are required, and it is essential that the project run smoothly regardless of when or by whom any given consensus-building operation is performed. Here, a 'consensus-building task' means a task that seeks to share or bring together information or opinions of responsible parties or achieve an agreement between the responsible parties by means of a business meeting with a responsible party, a connection by email or phone with the responsible party, or a one-to-one, face to face informal conversation with the responsible party known as a 'background work,' and so forth.

However, although currently available process management tools are able to present an awareness of progress based on operation planning, performance, and schedules, and a predictive model for schedule adjustments, a technology which performs schedule management of consensus-building tasks including background work has not been established.

The present invention was devised in view of the foregoing points and an object of this invention is to propose a project support system and method capable of supporting the smooth operation of a project by managing a schedule of consensus-building tasks including background work by a project manager.

In order to achieve the foregoing object, the present invention is a project support system which supports the execution of a project, comprising a model case generation unit which generates, for each of predetermined units that the project comprises, a model case which prescribes a target for each consensus-building task, and an ideal execution time and execution method for each of the consensus-building tasks, based on the performance of each consensus-building task executed in a previous project, a project generation unit which generates a consensus-building plan which prescribes, for each of the predetermined units, a target, an execution time and an execution method for each of the consensus-building tasks which are to be executed in a current project, based on information of the current project which is input and the corresponding model case, and a display unit which displays the consensus-building plan that has been generated by the project generation unit, wherein the consensus-building task includes background work in which the execution method is an informal face-to-face conversation, wherein, in the model case, an optimal conversation format at execution of the background work is prescribed in addition to the target and ideal execution time for the background work, and wherein, when the background work is included in the consensus-building task which is to be executed in the current project, the project generation unit generates the consensus-building plan which includes the conversation format at execution of the background work in addition to the target and execution time for the background work.

Moreover, the present invention is a project support method which is executed in a project support system that supports the execution of a project, comprising a first step of generating, for each of predetermined units that the project comprises, a model case which prescribes a target for each consensus-building task, and an ideal execution time and execution method for each of the consensus-building tasks, based on the performance of each consensus-building task executed in a previous project, a second step of generating a consensus-building plan which prescribes, for each of the predetermined units, a target, an execution time and an execution method for each of the consensus-building tasks which are to be executed in a current project, based on information of the current project which is input and the corresponding model case, and a third step of displaying the consensus-building plan that has been generated, wherein the consensus-building task includes background work in which the execution method is an informal face-to-face conversation, wherein, in the model case, an optimal conversation format at execution of the background work is prescribed in addition to the target and ideal execution time for the background work, and wherein, in the second step, when the background work is included in the consensus-building task which is to be executed in the current project, the consensus-building plan which includes the conversation format at execution of the background work in addition to the target and execution time for the background work is generated.

According to the present invention, it is possible to realize a project support apparatus and method which enable the smooth execution of a project to be supported.

BRIEF DESCRIPTION OF DRAWINGS

FIG. 4 is a block diagram showing a configuration example of a project type management table.

FIG. 5 is a block diagram showing a configuration example of an operation content management table.

FIG. 6 is a block diagram showing a configuration example of a project responsible party management table.

FIG. 7 is a block diagram showing a configuration example of a project information management table.

FIG. 8 is a block diagram showing a configuration example of a schedule information management table.

FIG. 9 is a block diagram showing a configuration example of consensus-building plan management table.

FIG. 10 is a block diagram showing a configuration example of consensus-building performance management table.

FIG. 11 is a block diagram showing a configuration example of a process performance management table.

FIG. 12 is a block diagram showing a configuration example of a conversation performance management table.

FIG. 13 is a block diagram showing a configuration example of a previous performance management table.

FIG. 14 is a block diagram showing a configuration example of a model case management table.

FIG. 16 is a schematic drawing schematically showing a screen configuration example of a responsible party information input screen.

FIG. 18 is a schematic drawing schematically showing a screen configuration example of a consensus-building performance input screen.

FIG. 24 is a diagram serving to explain rescheduling processing.

FIG. 27 is a diagram serving to explain the processing content of model case generation processing.

FIG. 28 is a diagram serving to explain the processing content of model case generation processing.

FIG. 29B is a flowchart showing the process steps of model case generation processing.

DESCRIPTION OF EMBODIMENTS

An embodiment of the present invention will now be explained in detail with reference to the appended drawings.

(1) Configuration of Project Support System According to this Embodiment

Figure 1:
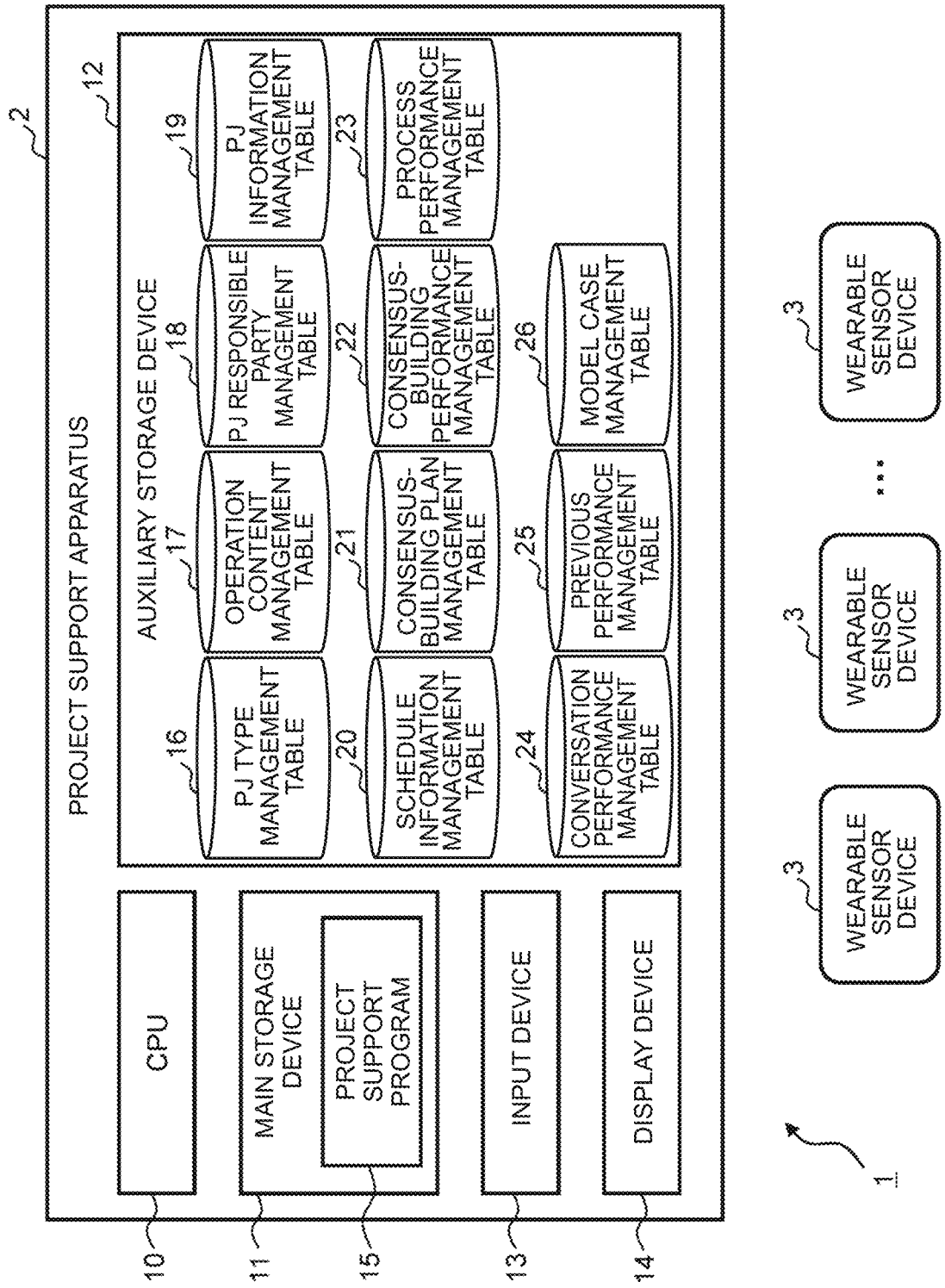
FIG. 1 is a block diagram showing the overall configuration of the project support system according to this embodiment.

In FIG. 1, 1 denotes the overall project support system according to this embodiment. This project support system 1 is configured by comprising a project support apparatus 2 and one or more wearable sensor devices 3.

The project support apparatus 2 is a computer device which has a function for managing a schedule of consensus-building tasks which the project manager is to execute and is configured by comprising a CPU (Central Processing Unit) 10, a main storage device 11, an auxiliary storage device 12, an input device 13 and a display device 14.

The CPU 10 is a processor which is tasked with controlling the overall operation of the project support apparatus 2. Furthermore, the main storage device 11 is configured from a volatile semiconductor memory such as a DRAM (Dynamic Random-Access Memory) and is used to store various programs and data temporarily. A project support program 15, described hereinbelow, is also stored and held in the main storage device 11.

The auxiliary storage device 12 is, for example, configured from a nonvolatile storage device such as a hard disk device or SSD (Solid State Drive) and is used to hold programs and data for long periods. The programs that are stored in the auxiliary storage device 12 are loaded onto the main storage device 11 when the project support apparatus 2 is starting up and as required, and as a result of the CPU 10 executing the programs that have been loaded onto the main storage device 11, the various processing of the whole project support apparatus 2 is executed.

A project type management table 16, an operation content management table 17, a project responsible party management table 18, a project information management table 19, a schedule information management table 20, a consensus-building plan management table 21, a consensus-building performance management table 22, a process performance management table 23, a conversation performance management table 24, a previous performance management table 25 and a model case management table 26, which are described hereinbelow, are stored and held in the auxiliary storage device 12.

The input device 13 is hardware that enables the user to make various inputs and is configured from a keyboard, mouse, and/or touch panel, and the like, for example. Furthermore, the display device 14 is used to display various GUI (Graphical User Interface) and processing results, and the like, and is configured from a liquid-crystal panel or organic EL panel or the like, for example.

The wearable sensor device 3 has a business card-shaped external form, for example, and is fitted by the project's responsible party by means of a strap, clip or safety pin, or the like. The wearable sensor device 3 is a sensor device that has a function which uses directional infrared rays to enable a wearer who has their own wearable sensor device 3 to see the wearer of another wearable sensor device 3 and to acquire identity information on their viewing partner.

Moreover, the wearable sensor device 3 has a function which, when a wearer of the own wearable sensor device 3 sees the wearer of another wearable sensor device 3 for a fixed time or more, determines that the wearer of the own wearable sensor device 3 is conversing with the wearer of the other wearable sensor device 3, and determines the conversation role of the wearer of the own wearable sensor device 3 in the conversation based on the frequency of movement of the wearer with their own wearable sensor device 3 at the time.

Note that the 'conversation role' that is determined by the wearable sensor device 3 refers to the main role of the wearer in this conversation, and such roles include 'speaker' when the wearer is mainly speaking continuously to their conversation partner, 'listener' when the wearer is mainly listening to their conversation partner speaking, and 'interaction' in which the wearer and conversation partner are both speaking where appropriate.

The wearable sensor device 3 determines the conversation role of the wearer of the own wearable sensor device 3 based on the empirical rule that a speaker speaks while moving their body in a conversation, the frequency of movement of the wearer of the own wearable sensor device 3, and the continuity of this movement.

Figure 2:
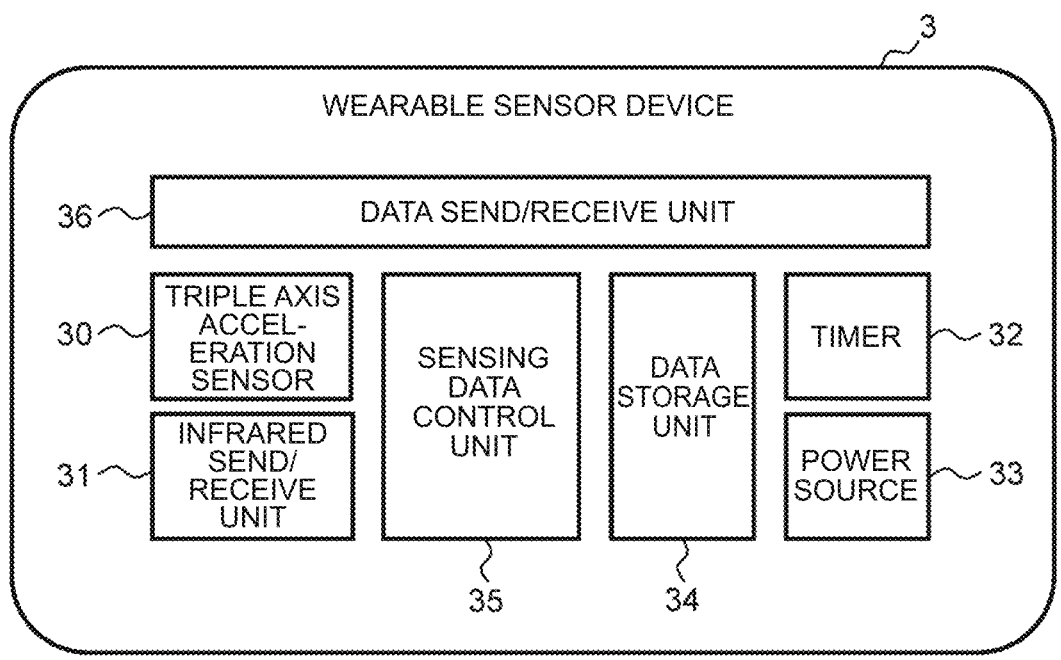
FIG. 2 is a block diagram showing a schematic configuration of a wearable sensor device.

FIG. 2 is a schematic configuration of the wearable sensor device 3. As shown in FIG. 2, the wearable sensor device 3 is configured by comprising a triple-axis acceleration sensor 30, an infrared send/receive unit 31, a timer unit 32, a power source unit 33, a data storage unit 34, a sensing data control unit 35, and a data send/receive unit 36.

The triple-axis acceleration sensor 30 is a module for detecting the frequency of movement of the wearer of the own wearable sensor device 3. Moreover, the infrared send/receive unit 31 is an infrared communication module which has a function which, at the time of a face-to-face conversation, performs infrared communication with the wearable sensor device 3 that is worn by the conversation partner and mutually and intermittently exchanges identification information of the wearer of the own wearable sensor device 3.

The timer unit 32 is configured from an electronic timer or atomic clock and presents the current time to the sensing data control unit 35. Furthermore, the power source unit 33 is configured, for example, from a coin cell battery, and supplies source power to the infrared send/receive unit 31, timer unit 32, data storage unit 34, sensing data control unit 35, and data send/receive unit 36. The data storage unit 34 is a storage device which is configured from a semiconductor memory.

The sensing data control unit 35 is configured from a microprocessor comprising a CPU, a ROM (Read Only Memory) and a RAM (Random Access Memory) and determines whether the wearer of the own wearable sensor device 3 is conversing face-to-face with the wearer of another wearable sensor device 3 based on whether the infrared send/receive unit 31 has continuously received infrared rays which are emitted by the other wearable sensor device 3 for a fixed time or more.

Moreover, upon determining that the wearer of the own wearable sensor device 3 is conversing face-to-face with the wearer of another wearable sensor device 3, the sensing data control unit 35 determines the conversation role of the wearer of the own wearable sensor device 3 in the last predetermined period, for each predetermined period (one minute, for example), based on the frequency of movement of the wearer of the own wearable sensor device 3, which is measured by the triple-axis acceleration sensor 30, and the continuity of this movement.

For example, if the frequency of the movement of the wearer with their own wearable sensor device 3 at conversation is continuously at or above a predetermined threshold (2 [Hz], for example, and called the conversation role determination threshold hereinbelow), the sensing data control unit 35 determines that the conversation role of the wearer in this period is 'speaker.' Moreover, if the frequency of movement of the wearer in this period is continuously less than the conversation role determination threshold, the sensing data control unit 35 determines that the conversation role of the wearer in this period is 'listener.' Moreover, if the frequency of movement of the wearer of the wearable sensor device 3 in this period is intermittently at or above the conversation role determination threshold with gaps at fixed intervals, the sensing data control unit 35 determines that the conversation role of the wearer in this period is 'interaction.'

Further, the sensing data control unit 35 calculates, based on the conversation role determination result for each of these predetermined periods, the total time in the conversation when the conversation role of the wearer with their own wearable sensor device 3 is the 'speaker,' the total time same is the 'listener,' and the total time same is in an 'interaction.' Further, based on these calculated total times, the sensing data control unit 35 calculates each of the time ratios for which the conversation role of the wearer with their own wearable sensor device 3 is 'speaker,' 'listener,' or 'interaction' respectively in the whole conversation, and stores the calculation result in the data storage unit 34 as conversation role information in association with an identification number of the conversation partner, acquired by means of infrared communication with the wearable sensor device 3 worn by the conversation partner, and the conversation start and end times.

The data send/receive unit 36 is a communication device that comprises a function for sending each conversation role information item stored in the data storage unit 34 to the project support apparatus 2, as described hereinabove. Although, in the case of this embodiment, a USB (Universal Serial Bus) communication device module is assumed as the data send/receive unit 36, a module other than a USB communication module such as a wired communication module or wireless communication module and the like, for example, may also be applied.

Note that it is assumed that the project manager connects the own wearable sensor device 3 to the project support apparatus 2 on a regular basis (every few hours or every day, for example). As a result, conversation role information which is saved in the data storage unit 34 of the wearable sensor device 3 is regularly uploaded to the project support apparatus 2.

(2) Consensus-Building Plan Generation and Management Function

The consensus-building plan generation and management function which is installed on the project support apparatus 2 according to this embodiment will be explained next.

In this project, consensus-building tasks in which the project manager seeks to share information with each responsible party and form opinions are required, and the project manager is able to conduct the project smoothly by performing such consensus-building tasks for the appropriate responsible party with suitable timing.

Therefore, installed on the project support apparatus 2 according to this embodiment is a consensus-building plan generation and management function which generates and manages a consensus-building task execution plan (hereinafter called a consensus-building plan) for each responsible party which is to be executed, to enable the project manager to conduct the project smoothly, based on performance information of a project which was executed previously and which was of the same scale and of the same or a similar type.

Note that, in the ensuing explanation, a project is configured from a plurality of processes and each process is configured from one or more operations.

As means for realizing the consensus-building plan generation and management function according to this embodiment, the main storage device 11 of the project support apparatus 2 stores the project support program 15 as shown in FIG. 1. Furthermore, as shown in FIG. 3, the project support program 15 is configured from a project generation unit 40, a screen display unit 41, a progress management unit 42, a rescheduling unit 43, a previous performance generation unit 44 and a model case generation unit 45.

Figure 3:
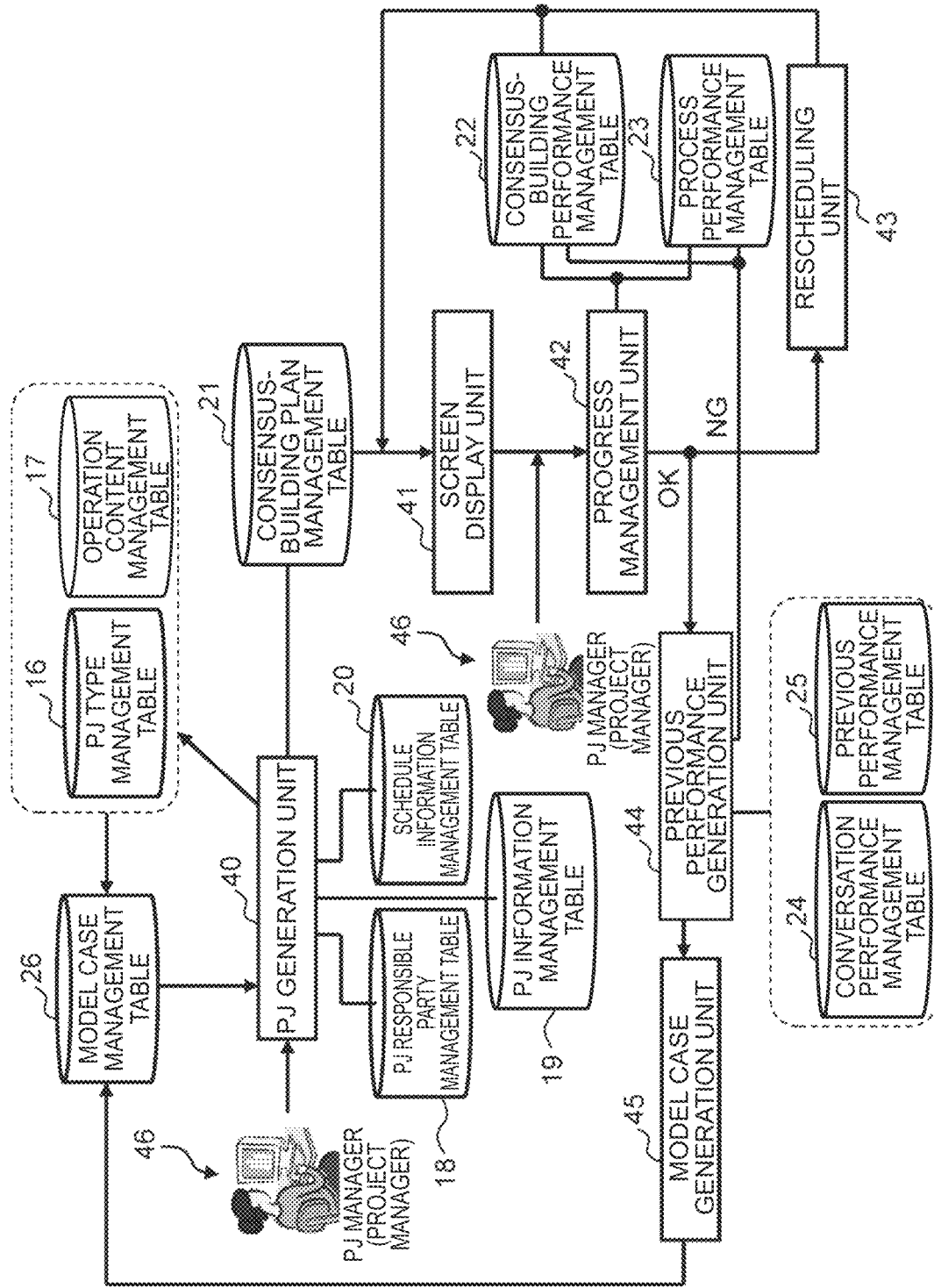
FIG. 3 is a block diagram showing correlations between the configuration of the project support program, and each module and table.

Moreover, as information for realizing the consensus-building plan generation and management function, the auxiliary storage device 12 of the project support apparatus 2 stores, as shown in FIGS. 1 and 3, the project type management table 16, operation content management table 17, project responsible party management table 18, project information management table 19, schedule information management table 20, consensus-building plan management table 21, consensus-building performance management table 22, process performance management table 23, conversation performance management table 24, previous performance management table 25 and model case management table 26.

The project generation unit 40 is a module which has a function for capturing various information relating to the project (the project name, budget scale, project type, operation period of each process and responsible party for each process, which are referred to as project information hereinbelow) which is input by the project manager 46 (FIG. 3) by using a project information input screen 50, described subsequently with reference to FIG. 15, for registering the captured project information in the project information management table 19, and registering information relating to the responsible party of the project among this project information, in the project responsible party management table 18 (FIG. 6).

Moreover, the project generation unit 40 also comprises a function for acquiring information on model cases (hereinafter called model case information) from the model case management table 26, described subsequently with reference to FIG. 14, and generating a consensus-building plan which prescribes a target for each consensus-building task to be executed by the project manager 46 and an execution time and execution method for these consensus-building tasks, based on the captured model case information and the project information. Here, a 'model case' signifies a model for the consensus-building plan for each process which prescribes a target for each consensus-building task to be executed in the project and an ideal execution time and execution method for these consensus-building tasks. Furthermore, the project generation unit 40 manages the consensus-building plan thus generated by registering same in the consensus-building plan management table 21 (FIG. 9).

The screen display unit 41 is a module which has a function for displaying various screens on the display device 14 (FIG. 1) according to operations by the project manager 46. More specifically, the screen display unit 41 displays the project information input screen 50 (FIG. 15), a responsible party information input screen 70, described subsequently with reference to FIG. 16, a consensus-building plan display screen 80, described subsequently with reference to FIG. 17, a consensus-building performance input screen 90, described subsequently with reference to FIG. 18, a background work performance display screen 100, described subsequently with reference to FIG. 19, and an operation performance input screen 110, described subsequently with reference to FIG. 20, and the like, on the display device 14.

The progress management unit 42 is a module which has a function for managing the progress of each consensus-building task to be executed by the project manager 46 for which an execution time has been prescribed in the consensus-building plan. In reality, the progress management unit 42 manages information on the performance of the consensus-building tasks (hereinafter called the performance information) which is input by the project manager 46 by using the consensus-building performance input screen 90 (FIG. 18) each time one consensus-building task is completed, and performance information relating to 'individual consultations' which is acquired from the conversation role information uploaded from the wearable sensor device 3 (FIG. 2) of the project manager 46, by registering same in the consensus-building performance management table 22. Note that an 'individual consultation' indicates a consensus-building task which is referred to as 'background work' and performed by means of an informal one-to-one, face-to-face conversation.

Moreover, the progress management unit 42 determines whether the progress of a consensus-building task has been delayed with respect to the consensus-building plan based on information on the consensus-building task performance information which has been input by the project manager 46, and the performance information relating to 'individual consultations' which is acquired from the conversation role information uploaded from the wearable sensor device 3 of the project manager 46, and based on the consensus-building plan generated by the project generation unit 40. Further, if there has been a delay in the progress of the consensus-building task, the progress management unit 42 issues a request to the rescheduling unit 43 to reschedule the remaining consensus-building task.

Moreover, the progress management unit 42 determines the (non)existence of a delay to each operation for each process based on the completion date of one operation which has been input by using an operation performance input screen 110, described subsequently with reference to FIG. 20, and the consensus-building plan generated by the project generation unit 40, and manages the determination result by registering same in the process performance management table 23.

The rescheduling unit 43 is a module which has a function for recreating (rescheduling) a new consensus-building plan in which the planned execution date and the like of each unexecuted consensus-building task has been changed, according to the request from the progress management unit 42. This consensus-building plan that has been rescheduled by the rescheduling unit 43 is displayed on display device 14 and presented to the project manager 46 by the screen display unit 41.

The previous performance generation unit 44 is a module which has a function for extracting the required performance information relating to the consensus-building tasks which are performed by means of 'individual consultation' from among the conversation role information that has been uploaded from the wearable sensor device 3 of the project manager 46, and storing the extracted performance information in the conversation performance management table 24.

Moreover, the previous performance generation unit 44 has a function for acquiring, from the consensus-building plan management table 21, performance information relating to the consensus-building tasks executed in processes (accomplished processes) which have been completed without delay to the consensus-building plan, based on the performance information for each consensus-building task registered in the consensus-building performance management table 22 and the performance information for each operation registered in the process performance management table 23, and storing the former performance information in the previous performance management table 25.

Moreover, the previous performance generation unit 44 acquires, from the conversation performance management table 24, performance information relating to 'individual consultation' consensus-building tasks which have been executed in operations that have ended without delay, based on the performance information for conversations which have been conducted in 'individual consultation' consensus-building tasks registered in the conversation performance management table 24 and the performance information for each operation registered in the process performance management table 23, and stores the former performance information in the previous performance management table 25.

The model case generation unit 45 is a module which has a function for generating, in process units, consensus-building plan model cases based on the performance information which has been stored in the previous performance management table 25. The model case generation unit 45 manages the process unit model cases thus generated by registering same in the model case management table 26.

Meanwhile, the project type management table 16 is a table which is used to manage the types of several projects (hereinafter called project types) which are preconfigured according to the content and budget scale and the like of a project. The project type management table 16 is created beforehand by the developer or user or the like of the project support program 15 (FIG. 1) and registered in the project support apparatus 2.

As shown in FIG. 4, the project type management table 16 is configured by comprising a project type ID field 16A, a project type name field 16B, a category field 16C, and a budget scale field 16D. In the project type management table 16, one row corresponds to one project type.

Furthermore, the project type ID field 16A stores an identifier (project type ID) which is specific to the project type and has been assigned to the corresponding project type, and the project type name field 16B stores a name (project type name) which represents a summary of the services provided by the project of the corresponding project type. Further, the category field 16C stores the objective of the corresponding project type, and the budget scale field 16D stores the budget scale of the project type.

Accordingly, in the case of the example in FIG. 4, for instance, it can be seen that a project type with the project type ID '1' which has been assigned the project type name 'big data analysis services' corresponds to a project directed at 'visualization' of the state of an organization which has a budget scale of '1,000,000 to 5,000,000.'

Moreover, the operation content management table 17 is a table which is used to manage the specific operation content of each operation that is executed in the project of each project type, and, like the project type management table 16, is created beforehand by the developer or user or the like of the project support program 15 (FIG. 1) and registered in the project support apparatus 2.

As shown in FIG. 5, the operation content management table 17 is configured by comprising a project type ID field 17A, an operation ID field 17B, a process field 17C, an operation content field 17D, and a responsibility field 17E. In the operation content management table 17, one row corresponds to one operation.

Furthermore, the operation ID field 17B stores an identifier (operation ID) which has been assigned to the corresponding operation, the process field 17C stores a name (process name) which has been assigned to the process which includes the corresponding operation, and the project type ID field 17A stores the project type ID of the project type to which the project including the process belongs. Moreover, the operation content field 17D stores the content of the operation. Furthermore, the responsibility field 17E stores the name of the responsibility of the responsible party who is tasked with the corresponding operation.

Accordingly, in the case of the example in FIG. 5, for instance, it can be seen that an operation 'W01,' which belongs to a project of a project type with the project type ID '1,' is an operation that is performed in the process with the process name 'definition of requirements,' and which has 'goal setting' as its operation content and for whose operation 'project (PJ) management' is to be responsible.

The project responsible party management table 18 is a table which is used to manage information relating to the developer of the project that is input by the project manager 46 (FIG. 3) by using the project information input screen 50, described subsequently with reference to FIG. 15, and this table is created for each project. As shown in FIG. 6, the project responsible party management table 18 is configured by comprising a responsible party ID field 18A, a responsible party name field 18B, a job title field 18C, a role field 18D, a company field 18E, a department field 18F, a section field 18G, and a location field 18H, and one row corresponds to one responsible party.

Furthermore, the responsible party ID field 18A stores an identifier (responsible party ID) that is assigned to the corresponding responsible party and specific to the responsible party, and the responsible party name field 18B stores the full name of the responsible party. Moreover, the job title field 18C stores the current job title of the responsible party, and the role field 18D stores the role in the project of the responsible party assigned by the project manager 46 (FIG. 3) by using the project information input screen 50.

Furthermore, the company field 18E stores the name of the company the responsible party belongs to, and the department field 18F and section field 18G store the names of the department (department field) and section (section field), respectively, to which the responsible party belongs in the company. Furthermore, the location field 18H stores the location of the responsible party.

Accordingly, in the case of the example in FIG. 6, it can be seen that 'Yamada Tarou,' who has been assigned the responsible party ID '001,' has a job title of 'director' in section A1 of department A of 'company . . . ,' is located in 'Shinagawa,' and has been assigned the role of 'project (PJ) management' in the corresponding project.

The project information management table 19 is a table which is used to manage the project information which has been input by the project manager 46 (FIG. 3) by using the project information input screen, described subsequently with reference to FIG. 15, and, as shown in FIG. 7, is configured by comprising a subject ID field 19A and a project type ID field 19B, and a process detail field 19C, which is made to correspond to each process that the project comprises and in the order of execution of these processes.

Furthermore, the subject ID field 19A stores an identifier (subject ID) which has been assigned to the corresponding project defined by the project manager 46 by using the project information input screen 50 (FIG. 14) and which is specific to the project, and the project type ID field 19B stores the project type ID of the project type to which the project belongs.

Further, the process detail field 19C is divided into a process name field 19CA, an operation period field 19CB, and a responsible party/role field 19CC. Moreover, the process name field 19CA stores the process name of the corresponding process, and the operation period field 19CB stores an operation period for the process which has been configured by the project manager 46 (FIG. 3) for this process by using the project information input screen 50. Moreover, the responsible party/role field 19CC stores the full names and roles of all the responsible parties that have been configured by the project manager 46 by using the project information input screen 50 and a responsible party information input screen 70, described subsequently with reference to FIG. 15, as the responsible parties for this process.

Accordingly, in the case of the example in FIG. 7, it can be seen that the project to which the subject ID '1' belongs to the project type '1,' and the operation period with the process name 'definition of requirements' which the project comprises has been configured to '2017/11/01 to 2017/11/05.' Moreover, it can be seen that 'Yamada Tarou,' 'Sato Kayo,' . . . have been configured as the responsible parties of the process and that the roles of these responsible parties in this process have been configured as 'PJ management (project manager)' and 'analysis' respectively.

The schedule information management table 20 is a table that is used to manage the schedule, for each time zone, of the responsible parties of the project, and is created for each project. As shown in FIG. 8, the schedule information management table 20 is configured by comprising a date field 20A and a time field 20B, and a schedule field 20C which is provided to correspond to each responsible party of the corresponding project. In the schedule information management table 20, one row corresponds to one time zone, and, in the case of this embodiment, one time zone is fifteen minutes.

Further, the date field 20A stores the date and the time field 20B stores the start time of the corresponding time zone. Moreover, each schedule field 20C stores information indicating the schedule on the corresponding day (date) and corresponding time zone of the corresponding responsible party.

Specifically, in the case of this embodiment, each schedule field 20C stores 'Null' when the corresponding responsible party has not input any plan in the corresponding time zone on the corresponding day, and stores '1' when a business meeting plan has already been input in the time zone and stores '2' when a plan other than a business meeting has already been input in the time zone.

Accordingly, in the case of the example in FIG. 8, it can be seen that, in the period '10:00 to 11:15' on '2017/11/01,' no plan has been input for the responsible party with the responsible party ID '001' (the values of the schedule fields 20C in all the time zones of this period are 'Null'), for the responsible party with the responsible party ID '002,' a 'business meeting' plan has been input from '10:00' to '10:45' (the values of the schedule fields 20C in each time zone of this period are '1'), and for the responsible party with the responsible party ID '003,' a plan 'other than a business meeting' has been input from '10:30' to '11:15' (the values of the schedule fields 20C all of the time zones of this period are '2').

Note that it is assumed that the schedule of each responsible party in the schedule information management table 20 is registered as a result of the project manager 46 or each responsible party suitably inputting their own schedule or the schedule of another responsible party manually, but when there exists a database for managing the schedules of employees in the company, the project support apparatus 2 may automatically acquire information of the schedules of responsible parties in the company from this database and register this information in the schedule information management table 20.

The consensus-building plan management table 21 is a table which is used for managing consensus-building plans which have been generated by the project generation unit 40 and, as shown in FIG. 9, is configured by comprising a subject ID field 21A, an operation ID field 21B, a date field 21C, a start time field 21D, an end time field 21E, an execution method field 21F, a consensus-building target responsible party field 21G and a conversation role field 21H. In the consensus-building plan management table 21, one row corresponds to one consensus-building task.

Furthermore, the subject ID field 21A stores the identifier (subject ID) which has been assigned to the project that is actually being executed or has been executed and which is specific to the project, and the operation ID field 21B stores the operation ID of each operation that is executed in the corresponding project. Further, the date field 21C stores the date for performing the corresponding consensus-building task and the start time field 21D and end time field 21E store the time when the consensus-building task is to be started (the start time) or the time when same is to end (the end time) respectively.

Furthermore, the execution method field 21F stores the execution method which is to be used when the corresponding consensus-building task is executed. Note that this execution method includes an 'individual consultation' that is to be executed by the project manager 46 in addition to 'email,' 'phone call,' and 'business meeting,' and the like.

Moreover, the consensus-building target responsible party field 21G stores the responsible party ID of the responsible party who is to be the target of the corresponding consensus-building task (hereinafter called the consensus-building target responsible party), and the conversation role field 21H stores the conversation role of the project manager 46 in the conversation that is conducted in the 'individual consultation' when the execution method is 'individual consultation.'

Accordingly, in the case of the example of FIG. 9, for instance, among the consensus-building tasks which are to be executed by the project manager 46 in the operation with the operation ID 'W01' of the project to which the subject ID '1' has been assigned, the consensus-building task for which the responsible party with the responsible party ID '002' is the consensus-building target responsible party has been prescribed an 'appointment' by means of 'email' on '2017/11/01' and a 'business meeting' which is to be conducted from '13:00' to '14:00' on '2017/11/2.' Moreover, among the consensus-building tasks which are to be executed by the project manager 46 in this operation, the consensus-building task for which the responsible party with the responsible party ID '003' is the consensus-building target responsible party has been prescribed an 'individual consultation' which is to be conducted with the conversation role of 'speaker' from '15:00' to '15:30' on '2017/11/01.'

The consensus-building performance management table 22 is a table which is used to manage the performance of each consensus-building task that has been executed up to now by the project manager 46 (FIG. 3) in the current project, and, as shown in FIG. 10, is configured by comprising a subject ID field 22A, an operation ID field 22B, a date field 22C, a start time field 22D, an end time field 22E, an execution method field 22F, a consensus-building target responsible party field 22G, an interaction time ratio field 22H, a speaker time ratio field 22I, and a listener time ratio field 22J. In the consensus-building performance management table 22, one row corresponds to the performance of one consensus-building task.

Furthermore, the subject ID field 22A stores the subject ID of the project for which the corresponding consensus-building task has been executed, and the operation ID field 22B stores the operation ID of the operation for which the consensus-building task has been performed. Further, the date field 22C stores the date when the consensus-building task was executed, and the start time field 22D and end time field 22E store the time when the consensus-building task was started (the start time) and the time when the consensus-building task ended (the end time) respectively. Moreover, the execution method field 22F stores the execution method when the consensus-building task was executed, and the consensus-building target responsible party field 22G stores the responsible party ID of the consensus-building target responsible party in the consensus-building task.

When the execution method of the consensus-building task is 'individual consultation,' the interaction time ratio field 22H stores a time ratio for when the conversation role of the project manager 46 relative to the whole time, from start to finish, of the individual consultation is 'interaction.'

Moreover, when the execution method of the consensus-building task is 'individual consultation,' the speaker time ratio field 22I stores a time ratio for when the conversation role of the project manager 46 relative to the whole time, from start to finish, of the individual consultation is 'speaker.'

Moreover, when the execution method of the consensus-building task is 'individual consultation,' the listener time ratio field 22J stores a time ratio for when the conversation role of the project manager 46 relative to the whole time, from start to finish, of the individual consultation is 'listener.'

Note that numerical values for these time ratios of when the conversation role of the project manager 46 is 'interaction,' 'speaker,' and 'listener,' respectively, which the project support apparatus 2 has acquired from the conversation role information which was uploaded from the wearable sensor device 3 of the project manager 46, are each stored.

Accordingly, in the case of the example of FIG. 10, for instance, it can be seen that, among the consensus-building tasks which have been executed in the operation with the operation ID 'W01' of the project to which the subject ID '1' has been assigned, in the 'individual consultation' which was conducted from '15:00' to '15:45' on '2017/11/01' and for which the responsible party with the responsible party ID '003' was the consensus-building target responsible party, the time ratio when the conversation role of the project manager 46 was 'interaction' is '0.1,' the time ratio when same was 'speaker' is '0.6,' and the time ratio when same was 'listener' is '0.3.'

The process performance management table 23 is a table which is used to manage the performance of each process which has ended up to now in the project (more precisely, the performance of each operation that each process comprises) and, as shown in FIG. 11, is configured by comprising a subject ID field 23A, a process field 23B, an operation ID field 23C, a start date field 23D, an end date field 23E, and a delay (non)existence field 23F. In the process performance management table 23, one row corresponds to one operation which each process comprises.

Moreover, the operation ID field 23C stores the operation ID of the corresponding operation, the process field 23B stores the process name of the process for which the operation has been executed, and the subject ID field 23A stores the subject ID of the project for which this process has been executed.

Moreover, the start date field 23D and end date field 23E store the start date and end date respectively of the corresponding operation. In the case of this embodiment, among the operation tasks that have been executed for the operations that have been assigned the same operation ID of the same subject ID in the consensus-building performance management table 22 (FIG. 10), the start date field 23D stores the date of the consensus-building task that was first started, and the end date field 23E stores the date of completion of the operation, which has been input by the project manager 46 (FIG. 3) by using the operation performance input screen 110, described subsequently with reference to FIG. 20, as the end date of the operation.

Moreover, the delay (non)existence field 23F stores a flag which is created beforehand and indicates whether there has been a delay to the operation relative to the consensus-building plan of the project (hereinafter called the delay (non)existence flag). The delay (non)existence flag is configured to '0' when there has been no delay to the corresponding operation and to '1' when there has been a delay.

Accordingly, in the case of the example of FIG. 11, it can be seen that, among three operations 'W01,' 'W02,' and 'W03,' which the process 'definition of requirements' comprises, in the project assigned the subject ID '1,' all of the consensus-building tasks pertaining to the operation assigned the operation ID 'W01' were started on '2017/11/01' and completed without delay on '2017/11/02' (the delay (non)existence flag is '0'), that all of the operation tasks pertaining to the operation assigned the operation ID 'W02' were started on '2017/11/03' and completed without delay on the same day (the delay (non)existence flag is '0'), and that all of the operation tasks pertaining to the operation assigned the operation ID 'W03' were started on '2017/11/04' and completed without delay on the same day (the delay (non)existence flag is '0').

The conversation performance management table 24 is a table which is used to manage the performance (hereinafter called the conversation performance) of the conversation role of the project manager 46 (FIG. 3) in consensus-building tasks which are executed by an 'individual consultation' in a process that has advanced without delay to the consensus-building plan of the project. As is shown in FIG. 12, the conversation performance management table 24 is configured by comprising a subject ID field 24A, an operation ID field 24B, a consensus-building target responsible party field 24C, an interaction time ratio field 24D, a speaker time ratio field 24E, a listener time ratio field 24F, and a total time field 24G. In the conversation performance management table 24, one row corresponds to one conversation performance.

Furthermore, the subject ID field 24A stores the subject ID of the project for which the corresponding 'individual consultation' has been executed, and the operation ID field 24B stores the operation ID of the operation in which the 'individual consultation' has been performed. Moreover, the consensus-building target responsible party field 24C stores the responsible party ID of the consensus-building target responsible party of the 'individual consultation.'

Moreover, the interaction time ratio field 24D, speaker time ratio field 24E, and listener time ratio field 24F store the same information as the information which is stored in the corresponding fields 22H to 22J of the interaction time ratio field 22H, speaker time ratio field 22I, and listener time ratio field 22J in the consensus-building performance management table 22 described earlier with reference to FIG. 10, respectively, and the total time field 24G stores the total time the corresponding 'individual consultation' was performed.

Note that numerical values for the interaction time ratio, speaker time ratio, and listener time ratio, and the total time the 'individual consultation' was performed, respectively, which the project support apparatus 2 has acquired from the conversation role information which was uploaded from the wearable sensor device 3 of the project manager 46, are each stored.

Accordingly, in the case of the example of FIG. 12, for instance, it can be seen that, within the total time '45' minutes in the 'individual consultation' which has been executed in the operation with the operation ID 'W01' of the project to which the subject ID '1' has been assigned, and for which the responsible party with the responsible party ID '003' was the consensus-building target responsible party, the time ratio when the conversation role of the project manager 46 was 'interaction' is '0.1,' the time ratio when same was 'speaker' is '0.6,' and the time ratio when same was 'listener' is '0.3.'

The previous performance management table 25 is a table which is used to manage consensus-building tasks which have been executed in a process that has been completed without delay to the consensus-building plan generated by the project generation unit 40 (FIG. 3) and, as shown in FIG. 13, is configured by comprising a subject ID field 25A, an operation ID field 25B, a start date field 25C, an execution method field 25D and a consensus-building target responsible party role field 25E.

Furthermore, the subject ID field 25A stores the subject ID of the project for which the corresponding consensus-building task has been executed, and the operation ID field 25B stores the operation ID of the operation for which the consensus-building task has been executed. Moreover, the start date field 25C stores the date when the consensus-building task was started, and the execution method field 25D stores the execution method with which the consensus-building task has been executed. Moreover, the consensus-building target responsible party role field 25E stores the role in the project of the consensus-building target responsible party who is being targeted in the consensus-building task.

Accordingly, in the case of the example of FIG. 13, for instance, it can be seen that, as the consensus-building tasks which are to be executed in connection with the operation with the operation ID 'W01' in the project with the subject ID '1,' there exist a consensus-building task for a consensus-building target responsible party whose role is 'analysis' and a consensus-building task for a consensus-building target responsible party whose role is 'equipment provision,' where the former consensus-building task was executed by 'email' on '2017/11/01' and the latter consensus-building task was executed by 'individual consultation' on '2017/11/01.'

The model case management table 26 is a table which is used to manage model cases which have been generated by the model case generation unit 45 as described hereinabove and, as shown in FIG. 14, is configured by comprising a project type ID field 26A, an operation ID field 26B, a progress ratio field 26C, an execution method field 26D, a consensus-building target responsible party role field 26E, a conversation time field 26F, and a conversation role field 26G. In the model case management table 26, one row corresponds to one consensus-building task.

Furthermore, the project type field 26A stores the project type ID of the project to which the corresponding model case is being applied, and the operation ID field 26B stores the operation ID of the operation for which the corresponding consensus-building task in the project has been executed.

Moreover, the progress ratio field 26C stores the ratio (hereinafter called the progress ratio) of the elapsed time since the process started until the consensus-building task is started relative to the total period of the process which comprises the operation for which the consensus-building task is executed.

Moreover, the execution method field 26D stores the execution method of the corresponding consensus-building task, and the consensus-building target responsible party role field 26E stores the role, in this project, of the consensus-building target responsible party in the consensus-building task.

Moreover, the conversation time field 26F stores the time (conversation time) of the conversation to be conducted with the consensus-building target responsible party when the corresponding consensus-building task is 'individual consultation,' and the conversation role field 26G stores the conversation role ('interaction,' 'speaker,' or 'listener') of the project manager 46 in this conversation.

Accordingly, in the case of the example of FIG. 14, for instance, it can be seen that the 'individual consultation,' which is executed in the operation with the operation ID 'W03' of the project belonging to a project type with the project type ID '5,' is to be conducted with timing where the 'progress ratio' is '0.81,' the conversation role of the project manager 46 (FIG. 3) is 'speaker,' the conversation time is '30' minutes and the target is a consensus-building target responsible party whose role is 'equipment provision.'

Figure 15:
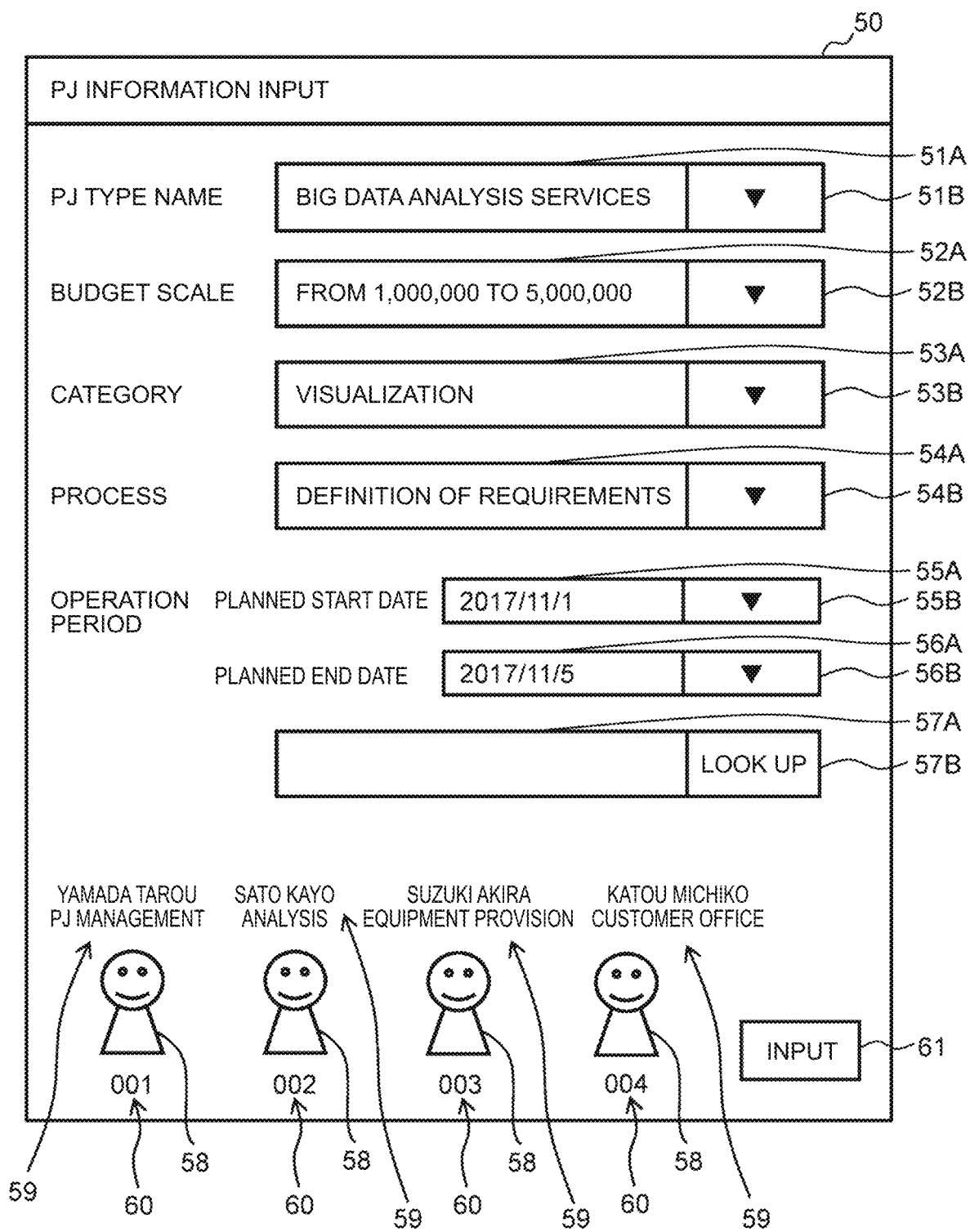
FIG. 15 is a schematic drawing schematically showing a screen configuration example of a project information input screen.

(3) Configuration of Various Screens (3-1) Project Information Input Screen and Responsible Party Information Input Screen FIG. 15 shows a screen configuration example of the project information input screen 50 which can be displayed on the display device 14 (FIG. 1) by means of a predetermined input operation via the input device 13 (FIG. 1). The project information input screen 50 is a screen enabling the project manager 46 (FIG. 3) to input, for a project which is to be executed now, project information such as the project name, the budget scale, the category, the operation period of each process and the responsible party for each process.

The project information input screen 50 is configured by comprising a project type name designation box 51A, a budget scale designation box 52A, and a category designation box 53A.

Further, by clicking a pulldown button 51B that is displayed on the right side of the project type name designation box 51A on the project information input screen 50, it is possible to display a pulldown menu (not shown) which shows all the project type names of each of the project types managed by the project type management table 16 (FIG. 4).

Thus, by selecting one project type name of the most suitable project type to which the current project belongs from among the project type names which are displayed in the pulldown menu, the project manager 46 is able to designate this project type name as the project type name of the project type to which the current project belongs. In this case, the selected project type name is displayed in the project type name designation box 51A.

Further, by clicking a pulldown button 52B that is displayed on the right side of the budget scale designation box 52A on the project information input screen 50, it is possible to display a pulldown menu (not shown) which shows all the budget scales that have been preregistered as budget scales for the project types of the project type name displayed in the project type name designation box 51A, which are managed by the project type management table 16.

Thus, by selecting one budget scale for the current project from among the budget scales which are displayed in the pulldown menu, the project manager 46 is able to designate this budget scale as the budget scale of the current project. In this case, the selected budget scale is displayed in the budget scale designation box 52A.

Further, by clicking a pulldown button 53B that is displayed on the right side of the category designation box 53A on the project information input screen 50, it is possible to display a pulldown menu (not shown) which shows all the categories that have been preregistered as categories for the project types whose project type name is displayed in the project type name designation box 51A, which are managed by the project type management table 16.

Thus, by selecting one, most suitable category as the category of the current project from among the categories which are displayed in the pulldown menu, the project manager 46 is able to designate this category as the category of the current project. In this case, the selected category is displayed in the category designation box 53A.

Meanwhile, provided below the category designation box 53A are a process designation box 54A, an operation period/planned start date designation box 55A, an operation period/planned end date designation box 56A, and a responsible party designation box 57A.

Further, by clicking a pulldown button 54B that is displayed on the right side of the process designation box 54A on the project information input screen 50, it is possible to display a pulldown menu (not shown) which shows the names of all the processes that have been preregistered as processes for the project whose project type name is displayed in the project type name designation box 51A, which are managed by the operation content management table 17 (FIG. 5).

Thus, by selecting one process name of a process which the current project comprises from among the process names which are displayed in the pulldown menu, the project manager 46 is able to designate the process with this process name as one process that the current project comprises. In this case, the designated process name is displayed in the process designation box 54A.

Further, by clicking a pulldown button 55B that is displayed on the right side of the operation period/planned start date designation box 55A on the project information input screen 50, it is possible to display a calendar.

Thus, by selecting a planned start date for the process whose process name is displayed in the process designation box 54A from among the dates in the calendar, the project manager 46 is able to designate this date as the planned start date of this process. In this case, the selected date is displayed in the operation period/planned start date designation box 55A.

Likewise, by clicking a pulldown button 56B that is displayed on the right side of the operation period/planned end date designation box 56A on the project information input screen 50, it is possible to display a calendar.

Thus, by selecting a planned end date for the process whose process name is displayed in the process designation box 54A from among the dates in the calendar, the project manager 46 is able to designate this date as the planned end date of this process. In this case, the selected date is displayed in the operation period/planned end date designation box 56A.

Furthermore, by clicking a lookup button 57B that is displayed on the right side of the responsible party designation box 57A on the project information input screen 50, it is possible to display the responsible party information input screen 70 shown in FIG. 16, overlaid on the project information input screen 50.

This responsible party information input screen 70 is a screen for registering the information of each responsible party (responsible party information) who is involved in the process, for which the process name is displayed in the process designation box 54A of the project information input screen 50 at the time, and is configured by comprising an in-company responsible party information registration field 70A and an outside-company responsible party information registration field 70B.

Further, the in-company responsible party information registration field 70A is provided with a responsible party name input text box 71A. Furthermore, on the responsible party information input screen 70, by using the input device 13 (FIG. 1) to input the full name of an in-company responsible party into the responsible party name input text box 71A from among the responsible parties of the process whose process name is displayed in the process designation box 54A of the project information input screen 50 at the time and then clicking a search button 71B that is displayed on the right side of the responsible party name input text box 71A, it is possible to conduct a search of the in-company database (not shown) for the full name, role, place of work (company name and department), job title and location, and display the search results below the responsible party name input text box 71A.

Further, the in-company responsible party information registration field 70A is provided with a role designation box 72A. Further, by clicking a pulldown button 72B that is displayed on the right side of the role designation box 72A on the responsible party information input screen 70, it is possible to display a pulldown menu (not shown) which shows all the roles that are required for the project type whose project type name is displayed in the project type name designation box 51A of the project information input screen 50, which are managed by the operation content management table 17.

Thus, by selecting one role from among the roles which are displayed in the pulldown menu, the project manager 46 is able to designate this role as the role that is assigned to the responsible party whose full name is displayed in the responsible party name input text box 71A at the time. In this case, the selected role is displayed in the role designation box 72A.

Furthermore, on the information input screen 70, by clicking an input button 78 which is displayed in the bottom right of the responsible party information input screen 70 after displaying the full name, place of work, location, job title and role of the person who is to be registered at the time in the in-company responsible party information registration field 70A as described hereinabove, it is possible to register this person as a responsible party of the project.

Furthermore, the outside-company responsible party information registration field 70B comprises a full name text box 73, a place of work text box 74, a location text box 75, and a job title text box 76, and a role designation box 77A and pulldown button 77B which have the same functions as the role designation box 72A and pulldown button 72B respectively of the in-company responsible party information registration field 70A.

Furthermore, the project manager 46 is able to input the full name of an outside-company responsible party into the responsible party name input text box 71A of the in-company responsible party information registration field 70A, input the full name of the outside-company responsible party of the project into the full name text box 73, the place of work of the responsible party into the place of work text box 74, the location of the responsible party into the location text box 75, and the job title of the responsible party into the job title text box 76, and display the role of the responsible party in the role designation box 77A by designating same in the same manner described hereinabove, and, by subsequently clicking the input button 78, is able to register this responsible party as a responsible party of the project.

Furthermore, when an in-company or outside-company responsible party has been registered as described hereinabove, the responsible party information input screen 70 is closed, the full name of the responsible party registered at the time is displayed in the responsible party designation box 57A of the project information input screen 50 (FIG. 15), and an icon 58 for the responsible party is displayed below the responsible party designation box 57A. Moreover, a character string 59 which represents the full name and role of the responsible party is displayed above the icon 58, and a character string 60 which represents the responsible party ID assigned to the responsible party is displayed below the icon 58.

Further, on the project information input screen 50, by registering an operation period for each process of the project as described hereinabove and clicking an input button 61 below and to the right after registering all the responsible parties of the project, this information (project information) can be registered in the project support apparatus 2. Thereafter, among the project information registered at this time, the information which relates to the responsible parties (responsible party information) is registered in the project responsible party management table 18 (FIG. 6) and the remaining project information is stored in the project information management table 19.

(3-2) Consensus-Building Plan Display Screen, Consensus-Building Performance Input Screen, and Background Work Performance Display Screen.

Figure 17:
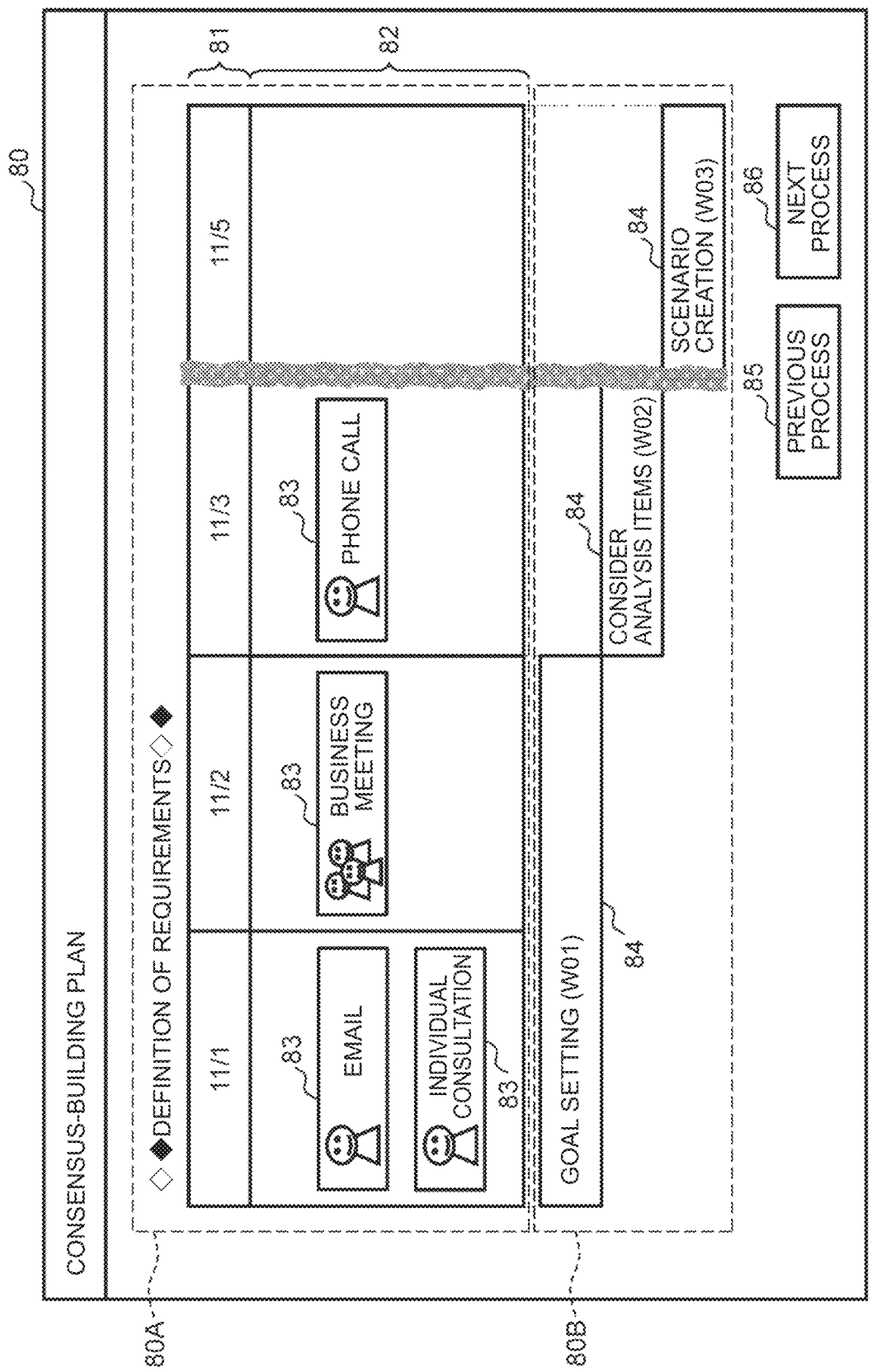
FIG. 17 is a schematic drawing schematically showing a screen configuration example of a consensus-building plan display screen.

Meanwhile, FIG. 17 shows a configuration example of a consensus-building plan display screen 80 for displaying the consensus-building plan, of the project, which has been generated by the project generation unit 40 (FIGS. 1 and 3) based on model case information that has been registered in the model case management table 26 (FIG. 14) by using the project information input screen 50 and responsible party information input screen 70, as described hereinabove. This consensus-building plan display screen 80 is a screen which can be displayed on the display device 14 (FIG. 1) by means of a predetermined input operation via the input device 13 (FIG. 1) to the project support apparatus 2.

The consensus-building plan display screen 80 is configured by comprising a consensus-building plan display field 80A and an operation content display field 80B. The consensus-building plan display field 80A has a calendar-like configuration which comprises a date field 81 and a consensus-building task field 82, and in which dates are listed in the date field 81 and icons (hereinafter called consensus-building task icons) 83 which list the execution methods of the consensus-building task to be executed on the date generated by the project generation unit 40 (FIGS. 1 and 3) are displayed in the consensus-building task field 82. Moreover, the operation content display field 80B displays a belt-shaped operation content display icon 84 which shows the operation content that is to be executed on the corresponding date.

Figure 19:
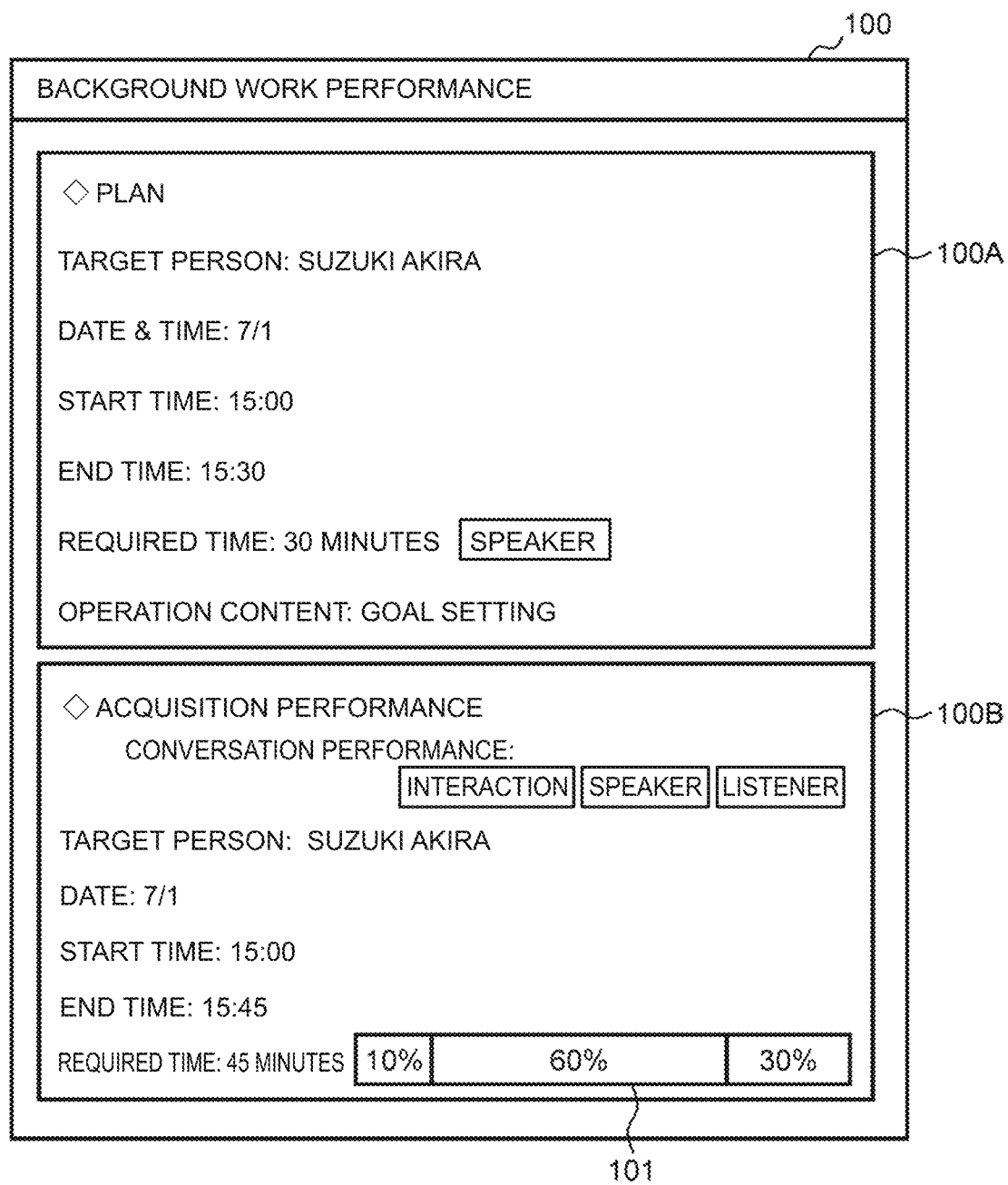
FIG. 19 is a schematic drawing schematically showing a screen configuration example of a background work performance screen.

Furthermore, by clicking a consensus-building task icon 83 which corresponds to a consensus-building task other than 'individual consultation' among the consensus-building task icons 83 that are displayed in the consensus-building plan display field 80A on the consensus-building plan display screen 80, a consensus-building performance input screen 90 as shown in FIG. 18 can be displayed overlaid on the consensus-building plan display screen 80. Furthermore, by clicking a consensus-building task icon 83 which corresponds to an 'individual consultation' consensus-building task among the consensus-building task icons 83 that are displayed in the consensus-building plan display field 80A on the consensus-building plan display screen 80, a background work performance display screen 100 as shown in FIG. 19 can be displayed overlaid on the consensus-building plan display screen 80.

Furthermore, a pre-process button 85 and a post-process button 86 are displayed below the operation content display field 80B. Moreover, by clicking the pre-process button 85 on the consensus-building plan display screen 80, it is possible to display the consensus-building plan of a process, in the corresponding project, which immediately precedes the process for which the consensus-building plan is currently being displayed and, by clicking the post-process button 86, it is possible to display the consensus-building plan of a process, in the corresponding project, which immediately follows the process for which the consensus-building plan is currently being displayed FIG. 17 shows the consensus-building performance input screen 90 which is displayed overlaid on the consensus-building plan display screen 80 upon clicking a consensus-building task icon 83 which corresponds to a consensus-building task other than 'individual consultation' that is displayed in the consensus-building plan display field 80A of the consensus-building plan display screen 80 as described hereinabove.

This consensus-building performance input screen 90 is a screen for confirming the specific content of the consensus-building task when the project manager 46 actually executes the consensus-building task which corresponds to the selected consensus-building task icon 83, and for registering the performance of the consensus-building task after execution of the consensus-building task has ended, and, as shown in FIG. 8, is configured by comprising a plan display field 90A and a performance registration field 90B.

The plan display field 90A displays a plan for the responsible party (target person) who is the target of the consensus-building task, the date, the execution method and the operation content, which were prescribed in the consensus-building plan that was generated by the project generation unit 40 (FIGS. 1 and 3) for the corresponding consensus-building task. Accordingly, the project manager 46 is able to confirm the specific content of the consensus-building task which they are to execute themselves before executing the consensus-building task, based on the plan displayed in the plan display field 90A.

The performance registration field 90B is a field for registering the performance of the consensus-building task after execution of the corresponding consensus-building task has ended. The performance registration field 90B comprises a target person designation box 91A, a date designation box 92A, a start time designation box 93A, an end time designation box 94A, an execution method designation box 95A and an operation content designation box 96A.

Furthermore, by clicking a pulldown button 91B which is displayed on the right side of the target person designation box 91A on the consensus-building performance input screen 90, it is possible to display a pulldown menu (not shown) which shows all the names of the responsible parties of the project which have been generated by the project generation unit 40 and registered in the consensus-building plan management table 21 (FIG. 9). Thus, by selecting one responsible party from among the responsible parties whose full names are displayed in the pulldown menu, the project manager 46 is able to designate this responsible party as the consensus-building task target responsible party for the consensus-building task. In this case, the full name of the designated consensus-building task target responsible party is displayed in the target person designation box 91A.

Further, by clicking a pulldown button 92B that is displayed on the right side of the date designation box 92A on the consensus-building performance input screen 90, it is possible to display a calendar (not shown). Thus, by selecting the date when the corresponding consensus-building task was executed from the dates in the calendar, the project manager 46 is able to designate this date as the date this consensus-building task was executed. In this case, the designated date is displayed in the date designation box 91A.

Furthermore, by clicking pulldown buttons 93B and 94B which are displayed on the right side of the start time designation box 93A and end time designation box 94A on the consensus-building performance input screen 90, it is possible to display a user interface screen (not shown) for designating a time. Thus, the project manager 46 is able to use this interface screen to designate the time when the corresponding consensus-building task was started or ended. In this case, the designated time is displayed in the corresponding start time designation box 93A and end time designation box 94A.

Furthermore, by clicking a pulldown button 95B which is displayed on the right side of the execution method designation box 95A on the consensus-building performance input screen 90, it is possible to display a pulldown menu (not shown) which shows all the preregistered execution methods for the consensus-building task. Thus, by selecting one execution method from among the execution methods which are displayed in the pulldown menu, the project manager 46 is able to designate this execution method as the execution method when executing this consensus-building task for the consensus-building target responsible party. In this case, the designated execution method is displayed in the execution method designation box 95A.

Furthermore, by clicking a pulldown button 96B which is displayed on the right side of the operation content designation box 96A on the consensus-building performance input screen 90, it is possible to display a pulldown menu (not shown) which shows all of the preregistered operation content. Thus, by selecting one operation content item from among the operation content items which are displayed in this pulldown menu, the project manager 46 is able to designate this operation content as the operation content for this consensus-building task. In this case, the designated operation content is displayed in the operation content designation box 96A.

Moreover, on this consensus-building performance input screen 90, by clicking an input button 97 which is displayed in the bottom right of the screen after displaying the target person, date, start time, end time, execution method and operation content, for when the corresponding consensus-building task was performed, in the target person designation box 91A, date designation box 92A, start time designation box 93A, end time designation box 94A, execution method designation box 95A and operation content designation box 96A respectively as described hereinabove, this content can be registered. The information which is registered at this time is then stored in the consensus-building performance management table 22 (FIG. 10).

Meanwhile, FIG. 19 shows the background work performance display screen 100 which is displayed overlaid on the consensus-building plan display screen 80 upon clicking a consensus-building task icon 83 which corresponds to an 'individual consultation' consensus-building task that is displayed in the consensus-building plan display field 80A of the consensus-building plan display screen 80 as described hereinabove.

This background work performance display screen 100 is a screen for confirming the specific content of the consensus-building task when the project manager executes the consensus-building task ('individual consultation') which corresponds to the selected consensus-building task icon 83, and for confirming the performance of the consensus-building task which is acquired by the wearable sensor device 3 (FIG. 2) when executing the consensus-building task, after execution of the consensus-building task has ended, and is configured by comprising a plan display field 100A and an acquisition performance field 100B.

Further, the plan display field 100A displays a plan for the responsible party (consensus-building task target responsible party) who is the target of the consensus-building task, the date, start time, end time, required time, conversation role (interaction, speaker, listener) and the operation content, which were prescribed in the consensus-building plan that was generated by the project generation unit 40 (FIGS. 1 and 3) for the corresponding consensus-building task ('individual consultation'). Accordingly, the project manager 46 is able to confirm the specific content of the consensus-building task which they are to execute themselves before executing the consensus-building task, based on the plan displayed in the plan display field 100A.

Moreover, the acquisition performance field 100B is a field which displays the performance of the consensus-building task that has been acquired by the wearable sensor device 3 (FIG. 2) and uploaded to the project support apparatus 2 when the consensus-building task is executed, after execution of the corresponding consensus-building task ('individual consultation') has ended. This acquisition performance field 100B displays the consensus-building task target responsible party, the date, the start time, the end time, and the required time, of the consensus-building task, which were acquired by the wearable sensor device 3 when the consensus-building task was executed, and a ratio display unit 101 in which the ratios, relative to the total time, for each conversation role of the project manager at the time of the execution (conversation) of the consensus-building task are displayed in the form of indicators.

Figure 20:
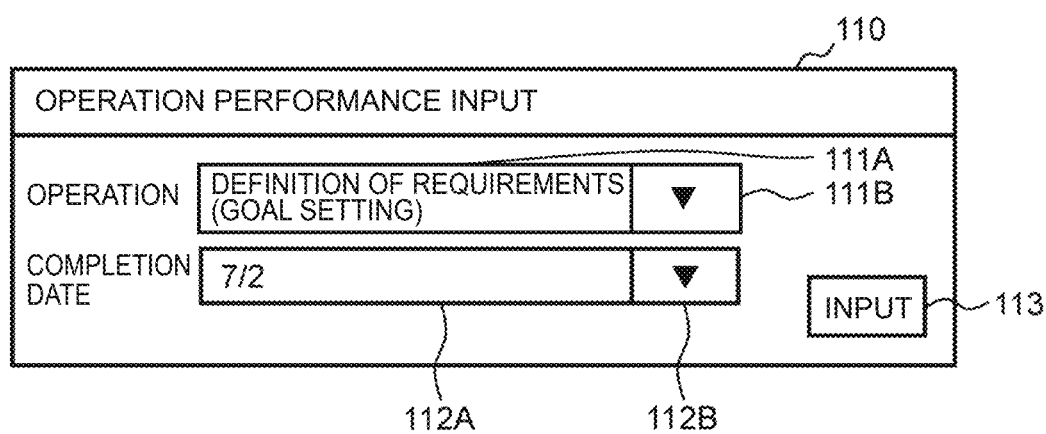
FIG. 20 is a schematic drawing schematically showing a screen configuration example of an operation performance input screen.

FIG. 20 shows an operation performance input screen 110 which can be displayed on the display device 14 (FIG. 1) by means of a predetermined input operation via the input device 13 (FIG. 1) to the project support apparatus 2. The operation performance input screen 110 is a screen enabling the project manager 46 to register the completion date of the operation each time one operation is completed and is configured by comprising an operation designation box 111A and a completion date designation box 112A.

Furthermore, by clicking a pulldown button 111B which is displayed on the right side of the operation designation box 111A on the operation performance input screen 110, it is possible to display, for the project type to which the corresponding project belongs, a pulldown menu (not shown) which lists the names (operation names) of all the operations of the process which are executed in the project of this project type and which are managed by using the operation content management table 17 (FIG. 5).

Thus, by selecting the operation name of one operation from among the operation names which are displayed in the pulldown menu, the project manager 46 (FIG. 3) is able to designate the operation for which the consensus-building task prescribed in the consensus-building plan is complete. In this case, the operation name of the designated operation is displayed in the operation designation box 111A.

Further, by clicking a pulldown button 112B that is displayed on the right side of the completion date designation box 112A on the operation performance input screen 110, it is possible to display a calendar (not shown). Thus, by selecting the date when the operation was completed from among the dates in the calendar, the project manager 46 is able to designate this date as the date the operation was completed. In this case, the designated date is displayed in the completion date designation box 112A.

Furthermore, on the operation performance input screen 110, by clicking an input button 113 which is displayed in the bottom right of the screen after displaying the operation name and operation completion date of the operation which is to be registered at this time in the operation designation box 111A and completion date designation box 112A respectively as described hereinabove, it is possible to register the completion date of this operation. The completion date of the operation which is registered at this time and the (non)existence of an operation delay to the consensus-building plan are then stored in the process performance management table 23 (FIG. 11).

Figure 21A:
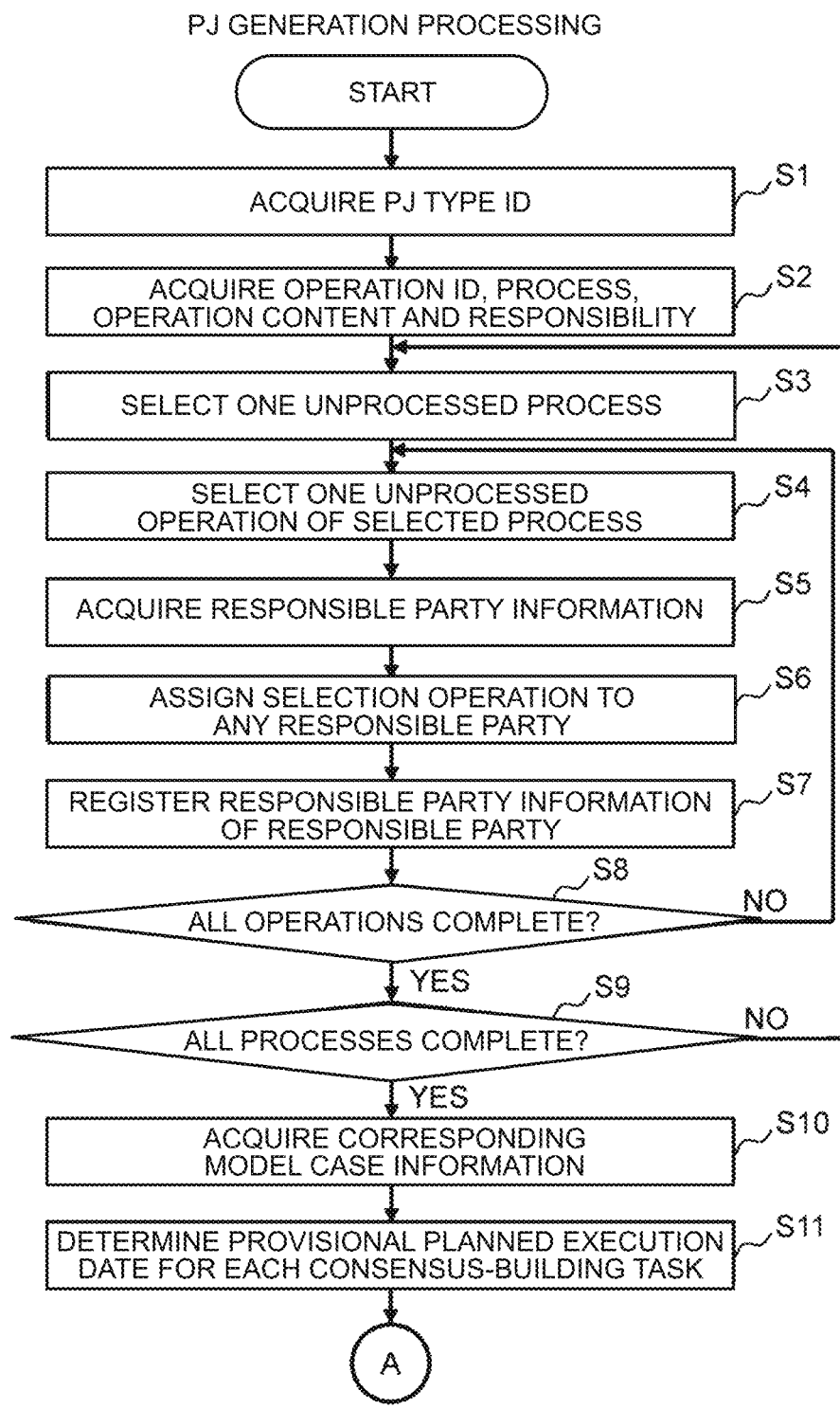
FIG. 21A is a flowchart showing the process steps of project generation processing.
Figure 21B:
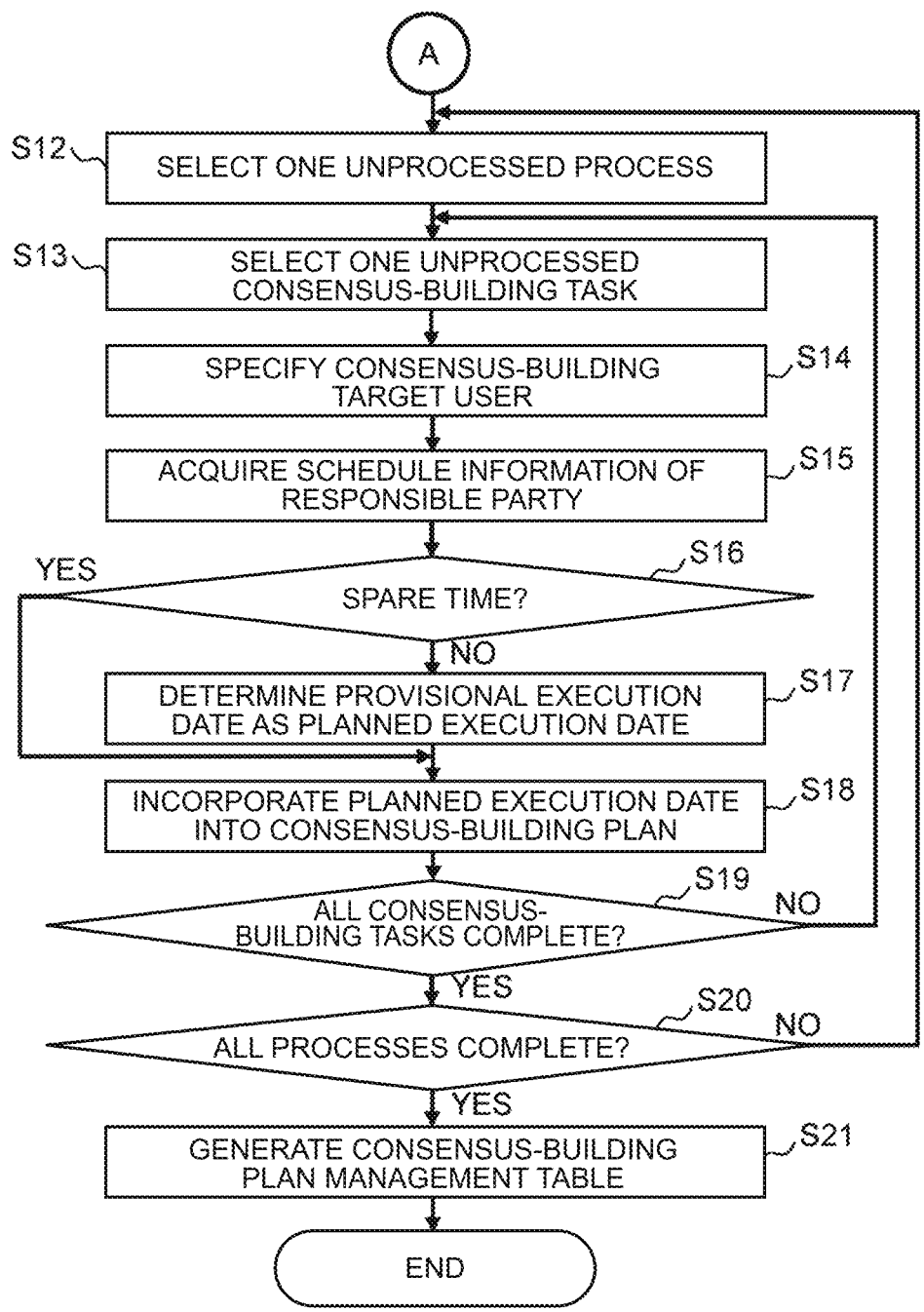
FIG. 21B is a flowchart showing the process steps of project generation processing.

(4) Processing of Each Module Pertaining to Consensus-Building Plan Generation and Management Function (4-1) Processing of Project Generation Unit FIGS. 21A and 21B show the processing content of the project generation processing that is executed by the project generation unit 40 (FIGS. 1 and 3) in connection with the consensus-building plan generation and management function according to this embodiment. The project generation unit 40 creates the consensus-building plan of the project for which project information has been registered, according to the process steps shown in FIGS. 21A and 21B.

In reality, the project generation unit 40 starts the project generation processing shown in FIGS. 21A and 21B when the project information for the current project is registered by the project manager 46 (FIG. 3) by using the project information input screen 50 described earlier with reference to FIG. 15.

Furthermore, the project generation unit 40 foremost acquires the project type ID of the project type which is closest to the project based on the project type name, budget scale, and category of the current project that has been registered by using the project information input screen 50, from the project type management table 16 (FIG. 4) (S1).

The project generation unit 40 then searches for the operation content management table 17 (FIG. 5) by taking the project type ID acquired in step S1 as the search key, and acquires all the processes which the project of the project type to which this project type ID has been assigned comprises, the operation ID of each operation which these processes comprise, the operation content of these operations, and each responsible party who is to be responsible for the operations respectively, from the operation content management table 17 (S2).

Specifically, the project generation unit 40 acquires, for each row, information that is stored in the operation ID field 17B (FIG. 5), process field 17C (FIG. 5), operation content field 17D (FIG. 5), and responsibility field 17E (FIG. 5) respectively of each row which stores the project type ID acquired in step S1 in the project type ID field 17A of the operation content management table 17.

Thereafter, the project generation unit 40 selects one process for which the processing from step S3 onwards is unprocessed from among each of the processes which the current project comprises that were acquired in step S2 (S3) and selects one operation for which the processing from step S5 onwards is unprocessed from among the operations which the selected process (hereinafter called the selection step) comprises (S4).

For example, when the project ID acquired in step S1 is '1' and the operation content management table 17 is configured as shown in FIG. 5, the project generation unit 40 selects one process from among the plurality of processes 'definition of requirements,' 'measurement provision' which the current project comprises in step S3. Moreover, when the process 'definition of requirements' is selected in step S3, for example, the project generation unit 40 selects one operation from among the plurality of operations 'goal setting,' 'analysis item configuration' . . . which this process comprises.

Thereafter, the project generation unit 40 acquires information (hereinafter called the responsible party information) such as the full name and job title, place of work, location, job title and role and the like of each responsible party of the current project which have been input by the project manager by using the responsible party information input screen 70 (FIG. 16) (S5), and, based on the role in particular among the acquired responsible party information for each responsible party, assigns the operation selected in step S4 for the corresponding responsible party (hereinafter called the selected operation) as the operation (responsibility operation) for which the responsible party is responsible (S6). The project generation unit 40 then registers the responsible party information on the responsible party, which includes the responsibility operation thus assigned, in the project responsible party management table 18 (FIG. 6) (S7).

Thereafter, the project generation unit 40 determines whether execution of the processing of steps S5 to S7 has ended for all of the operations which the selected process comprises (S8).

Upon obtaining a negative result in this determination, the project generation unit 40 then returns to step S4 and repeats the processing of steps S4 to S8 while sequentially replacing the operation subsequently selected (selected process) in step S4 with an operation which the selected process at the time comprises and for which the processing of step S5 onwards has not been executed. As a result of this repetitive processing, the parties responsible for each of the operations which the selected process at the time comprises are sequentially determined, and responsible party information, which includes the responsibility operations of the responsible parties, is sequentially registered in the project responsible party management table 18.

Upon obtaining an affirmative result in step S8 as a result of finishing before long to determine of all the responsible parties for each operation which the selected process comprises, the project generation unit 40 determines whether execution of the processing of steps S3 to S8 has ended for all the processes acquired in step S2 (S9).

Upon obtaining a negative result in this determination, the project generation unit 40 returns to step S3 and then repeats the processing of steps S3 to S9 while sequentially replacing the process selected in S3 (selected process) with another process which the current project comprises and for which the processing from step S4 onwards is unprocessed. As a result of this repetitive processing, the parties responsible for each of the operations which this process comprises are all determined for each process that the current project comprises, and responsible party information, which includes the responsibility operations of the responsible parties, is all registered in the project responsible party management table 18.

Upon obtaining an affirmative result in step S9 as a result of finishing before long to execute the processing of steps S4 to S8 for all the processes which the current project comprises, the project generation unit 40 acquires, from among the rows of the model case management table 26 (FIG. 14), the information of all the rows in which the project type ID acquired in step S1 is stored in the project ID field 26A (FIG. 14) as information on the model cases (model case information) of the current project (S10).

Thereafter, the project generation unit 40 determines, for each process of the current project, a planned execution date that is provisional (hereinafter called the provisional planned execution date) for the consensus-building tasks which are to be executed in connection with each operation which the process comprises, based on the operation period (the planned start date and planned end date) of each process that has been input by the project manager 46 via the project information input screen 50 (FIG. 15) (S11).

Specifically, the project generation unit 40 specifies the operation ID of each operation that the process comprises for each process which the current project comprises based on the information acquired in step S2.

For example, when the project type ID acquired in step S1 is '1' and the operation content management table 17 is configured as in FIG. 5, the project generation unit 40 specifies, for the process 'definition of requirements,' the operation ID of the operation 'goal setting' which the process comprises and the operation ID of the operation 'analysis item configuration' which the process comprises. Moreover, the project generation unit 40 specifies, for the process 'measurement provision,' the operation ID of the operation 'user briefing' and the operation ID of the operation 'equipment installation' which the process comprises. In this example, 'W01' is specified as the operation ID of the operation 'goal setting, and 'W02' as the operation ID of the operation 'analysis item configuration, 'X01' as the operation ID of the operation 'user briefing,' and 'X02' as the operation ID of the operation 'equipment installation.'

Moreover, the project generation unit 40 acquires, for each specified operation ID, the consensus-building target responsible party of each consensus-building task to be executed when the operation to which the operation ID has been assigned is executed, the execution method of this consensus-building task, and the progress ratio that was registered for the consensus-building task, from the model case information that was acquired in step S10. Furthermore, when the execution method of the consensus-building task is 'individual consultation,' the project generation unit 40 also acquires the conversation time and conversation role from the model case information acquired in step S10, in addition to this information.

Thereafter, the project generation unit 40 calculates, for each consensus-building task of the operation, the number of days from the planned start date of this process until the date when the consensus-building task is to be executed by multiplying the progress ratio of the consensus-building task, acquired as described hereinabove, by the operation period of the corresponding step that has been input by the project manager 46 via the project information input screen 50 (FIG. 15). Furthermore, the project generation unit 40 calculates the date when the consensus-building task is to be executed as the provisional planned execution date by adding the calculated number of days to the planned start date of the process.

Thereafter, the project generation unit 40 selects one process for which the processing of step S13 onwards is unprocessed from among the processes that the current project comprises (S12) and selects one consensus-building task from among the consensus-building tasks that are to be executed in connection with each operation which the selected process comprises (S13).

Moreover, the project generation unit 40 specifies the role of the consensus-building target responsible party in the consensus-building task selected in step S13, based on the model case information that was acquired in step S10, specifies the responsible party (consensus-building target responsible party) to which this role has been assigned in the current project by referring to the project responsible party management table 18 (FIG. 6) (S14), and acquires the schedule information of the consensus-building target responsible party from the schedule information management table 20 (FIG. 8) (S15).

Furthermore, the project generation unit 40 subsequently determines whether free time in the same time zone for executing the consensus-building task selected in step S13 on the consensus-building target responsible party exists for the project manager 46 and also the consensus-building target responsible party in the operation period of the process selected in step S12 (the operation period that has been configured by the project manager 46 by using the project information input screen 50), based on the schedule information of the consensus-building target responsible party that was acquired in step S15 (S16).

If an affirmative result is obtained in this determination, the project generation unit 40 then advances to step S18. Furthermore, if a negative result is obtained in the determination of step S16, the project generation unit 40 determines the provisional planned executed date of the consensus-building task that was determined in step S11 as the planned execution date of the consensus-building task (S17).

Thereafter, the project generation unit 40 subsequently incorporates the date when there exists free time in the same time zone for the project manager 46 and also the consensus-building target responsible party that was detected in step S16 (when an affirmative result was obtained in step S16) or the provisional planned execution date that was determined in step S17 (when a negative result was obtained in step S16) into the consensus-building plan of the current project, as the planned execution date of the consensus-building task selected in step S13 of the process which was selected in step S12 in the current project (S18).

Moreover, the project generation unit 40 determines whether execution of the processing of step S14 and subsequent steps has ended for all of the consensus-building tasks which are to be executed in the process selected in step S12 (S19). Upon obtaining a negative result in this determination, the project generation unit 40 then returns to step S13 and repeats the processing of steps S13 to S19 while sequentially replacing the consensus-building task selected in step S13 with another unprocessed consensus-building task.

Thereafter, upon obtaining an affirmative result in step S19 as a result of finishing before long to incorporate the planned execution dates of all the consensus-building tasks which are to be executed in the process selected in step S12 into the consensus-building plan of the current project, the project generation unit 40 determines whether execution of the processing of step S13 and subsequent steps has ended for all the processes of the current project (S20).

Upon obtaining a negative result in this determination, the project generation unit 40 then returns to step S12 and repeats the processing of steps S12 to S20 while sequentially replacing the process selected in step S12 with another unprocessed process.

Thereafter, upon obtaining an affirmative result in step S20 as a result of finishing before long to incorporate the planned execution dates of all the consensus-building tasks which are to be executed in the process into the consensus-building plan of the project, for all the processes in the current project, the project generation unit 40 generates the consensus-building plan management table 21 (FIG. 9) in which the information of the consensus-building plan of the current project generated by the processing thus far is registered (S21), and then ends the project generation processing.

Figure 22:
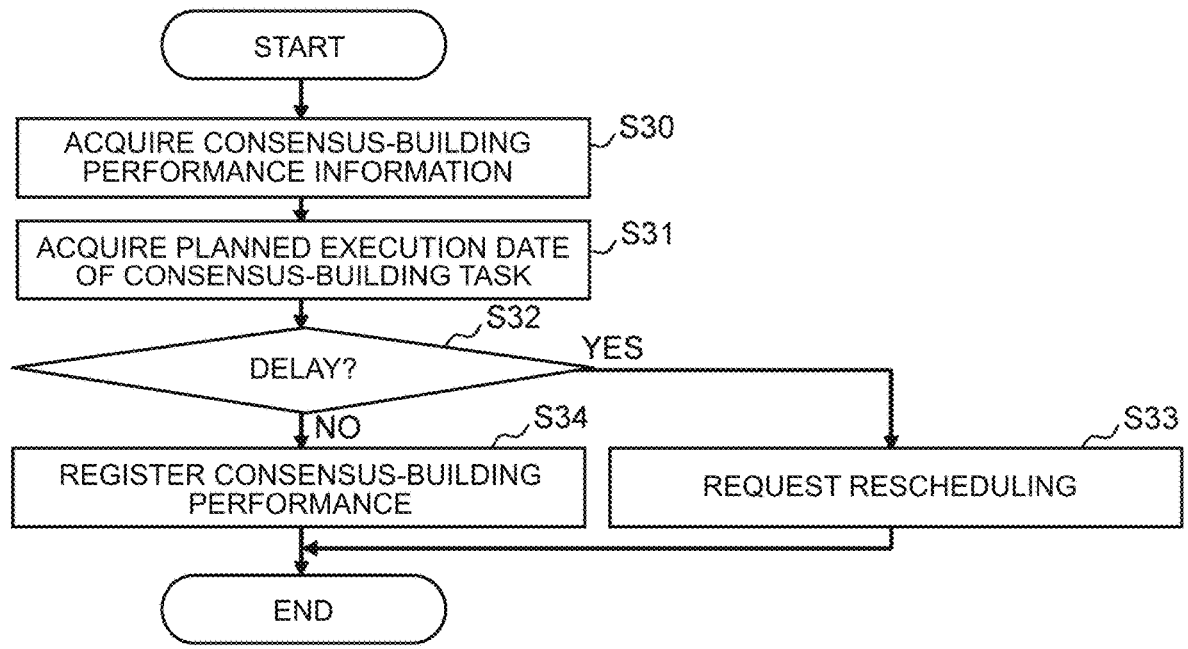
FIG. 22 is a flowchart showing the process steps of consensus-building performance registration processing.

(4-2) Processing of the Progress Management Unit
(4-2-1) Consensus-Building Performance Registration Processing FIG. 22 shows the processing content of the consensus-building performance registration processing that is executed by the progress management unit 42 (FIG. 3) in connection with the consensus-building plan generation and management function according to this embodiment. The progress management unit 42 registers performance information for each consensus-building task in the consensus-building performance management table 22 (FIG. 10) according to the process steps shown in FIG. 22.

In reality, when the performance of one consensus-building task is input by the project manager 46 (FIG. 3) by using the consensus-building performance input screen 90 described earlier with reference to FIG. 18 or information relating to the performance of one consensus-building task is uploaded from the wearable sensor device 3 of the project manager 46, the progress management unit 42 starts the consensus-building performance registration processing shown in FIG. 22 and foremost acquires information relating to the performance of one consensus-building task (information on the subject ID, operation ID, start time, end time and consensus-building target responsible party, hereinafter called the consensus-building performance information) which has been input by using the consensus-building performance input screen 90 at the time or uploaded from the wearable sensor device 3 (S30).

The progress management unit 42 then acquires the planned execution date of the consensus-building task from the consensus-building plan management table 21 (FIG. 9) (S31). Specifically, the progress management unit 42 specifies, from among the rows of the consensus-building plan management table 21, the rows in which the operation ID, execution method, and consensus-building target responsible party, which pertain to the consensus-building task and are included in the consensus-building performance information acquired in step S30, are stored in the operation ID field 21B (FIG. 9), the execution method field 21F (FIG. 9) or the consensus-building target responsible party field 21G (FIG. 9) respectively, and acquires the date which is stored in the date field 21C (FIG. 9) of this row as the planned execution date of the consensus-building task.

Moreover, by comparing the planned execution date acquired at this time with the date when the consensus-building task was actually executed which is identified based on the consensus-building performance information acquired in step S30, the progress management unit 42 determines whether the consensus-building task has been executed with a delay relative to the planned execution date (S32).

Further, upon obtaining an affirmative result in this determination, the progress management unit 42 issues a request to the rescheduling unit 43 (FIGS. 1 and 3) to reschedule the planned execution date and the like of each consensus-building task in the plan that is executed thereafter in the current project (S33), and then ends the consensus-building performance registration processing. Note that, in the ensuing explanation, the foregoing request in step S33 is called a rescheduling request, and the rescheduling request includes the operation ID of the operation (the operation for which the consensus-building task is executed) which corresponds to the consensus-building task for which the consensus-building performance has been input by using the consensus-building performance input screen 90 (FIG. 18) at the time or for which consensus-building performance information has been acquired from the wearable sensor device 3 of the project manager 46.

However, upon obtaining a negative result in the determination of step S32, the progress management unit 42 registers corresponding consensus-building performance information, of the consensus-building task, which was acquired in step S30 in the consensus-building performance management table 22 (FIG. 10) (S34) and then ends the consensus-building performance registration processing.

(4-2-2) Operation Performance Registration Processing

Figure 23:
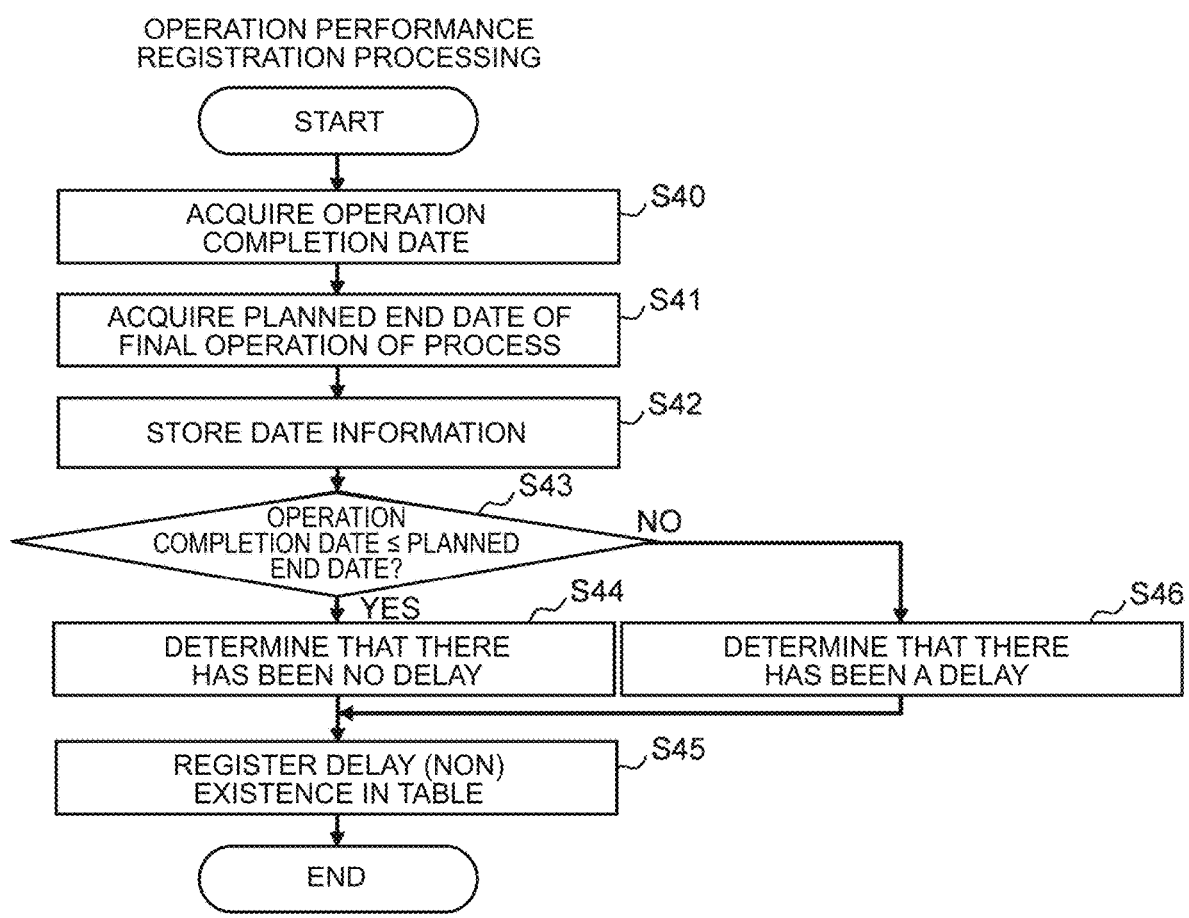
FIG. 23 is a flowchart showing the process steps of operation performance registration processing.

Meanwhile, FIG. 23 shows the process steps of operation performance registration processing that is executed by the progress management unit 42 when the completion date of one operation has been registered by using the operation performance input screen 110 described earlier with reference to FIG. 20. The progress management unit 42 registers the operation performance of the operation for which the completion date has been input at the time in the process performance management table 23 (FIG. 11) according to the process steps shown in FIG. 23.

In reality, when the completion date of the operation has been input by using the operation performance input screen 110, the progress management unit 42 starts the operation performance registration processing shown in FIG. 23 and foremost acquires the completion date of the corresponding operation that has been input by using the operation performance input screen 110 at the time (S40).

Thereafter, the progress management unit 42 acquires the process to which the corresponding operation, which has been input at the time by using the operation performance input screen 110, belongs from the operation content management table 17 (FIG. 5) and acquires the operation ID of each operation which this process comprises from the operation content management table 17. Furthermore, the progress management unit 42 then refers to the consensus-building plan management table 21 (FIG. 9) based on each operation ID thus acquired and acquires the planned execution date of the consensus-building task whose execution is planned last from among the consensus-building tasks that are to be executed in this process, from the consensus-building plan management table 21 as the planned end date of the last operation of this process (S41).

The progress management unit 42 then registers the information relating to the operation for which the completion date has been input by using the operation performance input screen 110 at the time in the process performance management table 23 (FIG. 11) (S42). Specifically, the progress management unit 42 acquires the subject ID, process name and operation ID of the operation from the operation content management table 17 (FIG. 5) and stores the acquired subject ID, process name and operation ID in the corresponding fields among the subject ID field 23A (FIG. 11), process field 23B (FIG. 11) and operation ID field 23C (FIG. 11) respectively of a new row in the process performance management table 23 (FIG. 11). Furthermore, the progress management unit 42 stores the completion date that was acquired in step S40 in the end date field 23E (FIG. 11) of this row in the process performance management table 23. Moreover, the progress management unit 42 stores the execution date of the consensus-building task which has been registered in the consensus-building performance management table 22 and which is executed first in this operation in the start date field 23D (FIG. 11) of this row in the process performance management table 23 as the start date for this task.

Thereafter, the progress management unit 42 determines whether the operation completion date acquired in step S40 is before the planned end date, of the last operation of the process to which the operation belongs, which was acquired in step S41 (S43).

Further, when an affirmative result is obtained in this determination, the progress management unit 42 determines that there has been no delay in the process to which this operation belongs, relative to the schedule planned in the consensus-building plan (S44) and ends the operation performance registration processing after storing a '0' which indicates that there has been no delay in the process in the delay (non)existence field 23F (FIG. 11) in the process performance management table 23 (FIG. 11) (S45).

However, when a negative result is obtained in the determination of step S43, the progress management unit 42 determines that there has been a delay in the process to which this operation belongs, relative to the schedule planned in the consensus-building plan (S46) and ends the operation performance registration processing after storing a '1' which indicates that there has been a delay in the process in the delay (non)existence field 23F in the process performance management table 23 (S45).

(4-3) Processing of the Rescheduling Unit

The processing of the rescheduling unit 43 (FIG. 3) will be explained next. In so doing, the execution difficulty level of a consensus-building task will be explained first. Here, the 'consensus-building task execution difficulty level' signifies the level of difficulty encountered when executing the consensus-building task.

Consensus-building tasks include conversation-type tasks such as business meetings, television conferences (TV conferences), phone calls and individual consultations and non-conversation type tasks which do not involve conversation with the consensus-building target responsible party and which utilize email and SNS (Social Networking Services) and the like. Normally, a conversation-type consensus-building task has a high level of execution difficulty because human resources must be secured for their execution, while non-conversation-type consensus-building tasks have a low execution difficulty level because human resources do not need to secured for their execution.

Therefore, in the case of this embodiment, as shown in FIG. 24, the execution difficulty level of each execution method of a consensus-building task is preconfigured based on matters that need to be considered when executing the consensus-building task (such as, for instance, the place, time, number of participants, and the location of the consensus-building target responsible party).

For example, because the place, time, number of participants, and location of the consensus-building target responsible party must all be considered for a 'business meeting,' the execution difficulty level to execute same is high. However, although the place, time and number of participants must be considered for a 'television conference,' such consideration does not extend to the location of the consensus-building target responsible party, and therefore the execution difficulty level is low in comparison with a 'business meeting.'

Moreover, although the time and location of the consensus-building target responsible party must be considered for an 'individual consultation,' since the place and number of participants need not be considered, the execution difficulty level is low in comparison with a 'television conference.' Moreover, although the time must be considered for a 'phone call,' no consideration needs to be paid to the place, number of participants or location of the consensus-building target responsible party, and therefore the execution difficulty level is low in comparison with an 'individual consultation.' Furthermore, with 'email,' there is no need to consider any of the place, time, number of participants or location of the consensus-building target responsible party, and therefore the execution difficulty level is lower than for a 'phone call.'

In view of the foregoing explanation, according to this embodiment, the execution difficulty level of a 'business meeting' is configured highest (with an execution difficulty level of '5'), while the remaining execution methods 'television conference,' 'individual consultation,' 'phone call,' and 'email' are each configured having a decreasing execution difficulty level in that order (the execution difficulty levels are configured as '4,' '3,' '2,' and '0' respectively). Incidentally, in this embodiment, the execution difficulty level of the execution method is a total points value that is found by assigning one point to the ○ [small white circle symbol] and zero points to the x [small cross symbol] in the execution method rows of FIG. 24, and then adding one point when the category of the execution method is 'conversation' type, and zero points when the category of the execution method is a 'non-conversation' type.

The higher the execution difficulty level of an execution method, the more labor and time that is required to execute the consensus-building task using the execution method, and hence it is possible to execute the same consensus-building task using an execution method of a lower execution difficulty level to shorten the time required to execute the consensus-building task.

Figure 25:
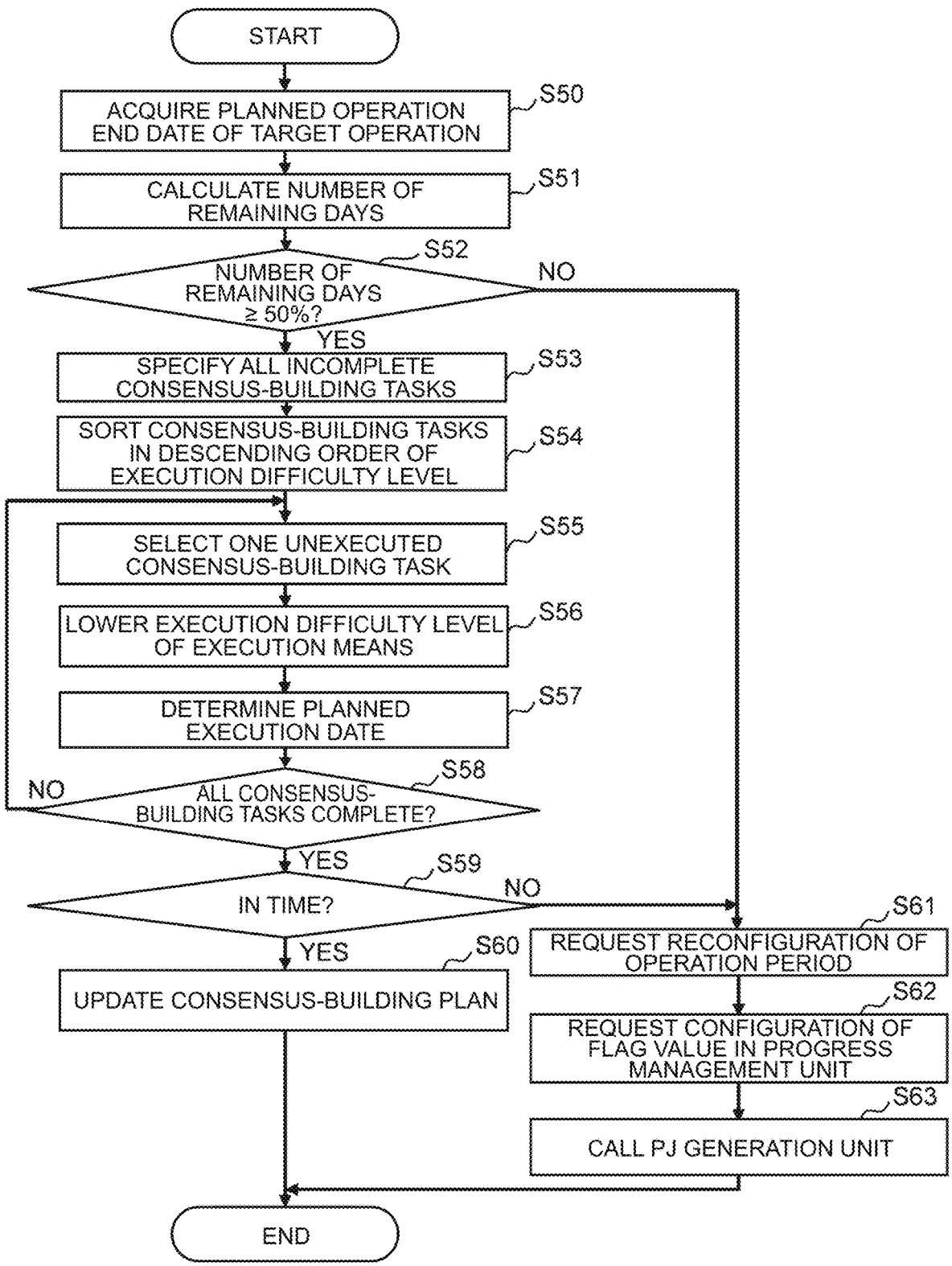
FIG. 25 is a flowchart showing the process steps of rescheduling processing.

FIG. 25 shows the process steps of the rescheduling processing which is executed by the rescheduling unit 43 (FIG. 3) upon receipt of a rescheduling request that has been issued from the progress management unit 42 (FIG. 3) in step S33 of the consensus-building performance registration processing described earlier with reference to FIG. 22.

Upon receipt of this rescheduling request, the rescheduling unit 43 starts the rescheduling processing shown in FIG. 25 and foremost refers to the consensus-building plan management table 21 (FIG. 9) based on the operation ID, of the operation that is being executed at the time, which is designated in this rescheduling request, and acquires the planned execution date of the consensus-building task whose execution is planned last (hereinafter the operation planned end date) among the consensus-building tasks which are executed in this operation (S50).

Specifically, the rescheduling unit 43 acquires, from among the rows of the consensus-building plan management table 21, the date that is stored in the date field 21C (FIG. 9) of the row in which the operation ID designated in the rescheduling request is stored in the operation ID field 21B (FIG. 9), as the planned execution date.

Thereafter, by subtracting the date of the last executed consensus-building task that is to be executed in this operation from the operation end execution date acquired in step S50 (that same day, hereinafter referred to as the most recent consensus-building performance date), the rescheduling unit 43 calculates the number of days remaining from the most recent consensus-building performance date until the operation end planned execution date (S51).

The rescheduling unit 43 then determines whether the number of days remaining calculated in step S51 is at or above 50% of the planned execution period of the operation (S52).

Here, obtaining an affirmative result in this determination means that there is still a surplus in the schedule until the operation planned end date that has been prescribed in the consensus-building plan for the operation. Accordingly, in this case, by simplifying the execution of these consensus-building tasks by lowering the execution difficulty level of each consensus-building task which has not yet been executed in the operation, an increase in the pace of execution of these consensus-building tasks is to be expected and, as a result, it can be expected that all the required consensus-building tasks will be completed by the operation planned end date for this operation (that is, completed by the operation planned end date).

Therefore, when an affirmative result is obtained in the determination of step S52, the rescheduling unit 43 first specifies all the consensus-building tasks which have not yet been executed among the consensus-building tasks that have been planned for this operation in the consensus-building plan (S53).

Specifically, the rescheduling unit 43 acquires all the information relating to the consensus-building tasks which are to be executed in this operation from the consensus-building plan management table 21, acquires all of the information relating to consensus-building tasks which have already been completed from the consensus-building performance management table 22 (FIG. 10) among these consensus-building tasks, and specifies all of the consensus-building tasks which have not yet been executed among the consensus-building tasks which have been planned for this operation in the consensus-building plan, based on the difference between the consensus-building tasks for which information has been acquired from the consensus-building plan management table 21 and the consensus-building tasks for which information has been acquired from the consensus-building performance management table 22.

The rescheduling unit 43 then places each of the consensus-building tasks specified in step S53 in order starting with the consensus-building task with the highest execution difficulty level, based on the execution methods of the consensus-building tasks (S54). The rescheduling unit 43 then selects one consensus-building task for which step S56 and subsequent steps are unprocessed among the consensus-building tasks placed in order of execution difficulty level in step S54 (for example, selects the consensus-building task with the highest execution difficulty level) (S55).

Thereafter, the rescheduling unit 43 changes the execution method of the consensus-building task selected in step S55 (hereinafter called the selected consensus-building task) to another execution method of an execution difficulty level one level lower (S56) and determines a planned execution date for executing the selected consensus-building task by means of the changed execution method (S57).

Note that the planned execution date is closest to the date for executing the selected consensus-building task which has been prescribed in the consensus-building plan management table 21, and a date on which the schedules of the consensus-building target responsible party and the project manager, of the selected consensus-building task, are both free in the same time zone is selected in the schedule information management table 20 (FIG. 8). However, in a case where the execution method after the change in step S56 is a non-conversation-type execution method, the earliest date among the dates when the selected consensus-building task can be executed is determined as the planned execution date.

Subsequently, the rescheduling unit 43 determines whether execution of step S55 and subsequent steps has ended for all of the unprocessed consensus-building tasks among the consensus-building tasks which are to be executed in the operation being executed at the time (S58). Further, upon obtaining a negative result in this determination, the rescheduling unit 43 returns to step S55 and then repeats the processing of steps S55 to S58 while sequentially replacing the consensus-building task selected in step S55 with another corresponding consensus-building task for which steps S56 to S57 are unprocessed.

Further, upon obtaining an affirmative result in step S58 as a result of finishing before long the determination of the post-change execution method and planned execution date for all of the unexecuted consensus-building tasks among the consensus-building tasks which are to be executed in the operation which is being executed at the time, the rescheduling unit 43 determines whether it is possible to finish the operation by the planned end date, which was originally planned in the consensus-building plan for the operation, as a result of the foregoing change in the execution method and planned execution date of the unexecuted consensus-building tasks (S59).

Specifically, the rescheduling unit 43 specifies, from among the rows of the consensus-building plan management table 21, the rows in which the operation ID of the operation being executed at the time is stored in the operation ID field 21B (FIG. 9), and acquires the latest date from among the dates which are stored in the date field 21C (FIG. 9) of each specified row. This date is the planned end date that was originally planned in the consensus-building plan for this operation. Further, the rescheduling unit 43 makes this determination by comparing this date with the planned execution date that has been determined by the processing of steps S56 to S57 for the consensus-building task which is executed last among the unexecuted consensus-building tasks of the consensus-building tasks which are to be executed in the operation that is being executed at the time.

Further, upon obtaining an affirmative result in the determination of step S59, the rescheduling unit 43 updates the consensus-building plan by overwriting the updated planned execution date of each corresponding consensus-building task that was determined in the repetitive processing of steps S55 to S58 to the date field 21C (FIG. 9) of the corresponding row in the consensus-building plan management table 21 (S60) and then ends the rescheduling processing.

However, upon obtaining an affirmative result in step S52 or a negative result in step S59, the rescheduling unit 43 displays a message on the display device 14 (FIG. 1) requesting that the project manager change the configuration of the operation periods of each of the processes which are being currently executed or have not yet been executed, in order to change the planned execution dates of the consensus-building tasks which have not yet been executed in the project (S61). The project manager 46 thus changes the configuration of the operation period of each process which is being currently executed and each subsequent process by using the project information input screen 50 (FIG. 15) according to this message.

Thereafter, the rescheduling unit 43 issues a request to the progress management unit 42 to configure the value of the delay (non)existence flag of each operation that has been executed up to that point which the process currently being executed comprises to '1,' in the performance of each process (each operation) that is being managed in the process performance management table 23 (FIG. 11) (S62). The foregoing ensures that the information of these processes is not used in model case generation processing that is subsequently performed.

Thereafter, the rescheduling unit 43 calls the project generation unit 40 (FIG. 3) and issues a request to regenerate the consensus-building plan of each consensus-building task which is to be executed by the project manager 46 thereafter based on the operation period of each process currently being executed and each subsequent process which have been reconfigured by the project manager 46 in step S61 (S63). The rescheduling unit 43 then ends the rescheduling processing.

(4-4) Processing of Previous Performance Generation Unit

Figure 26:
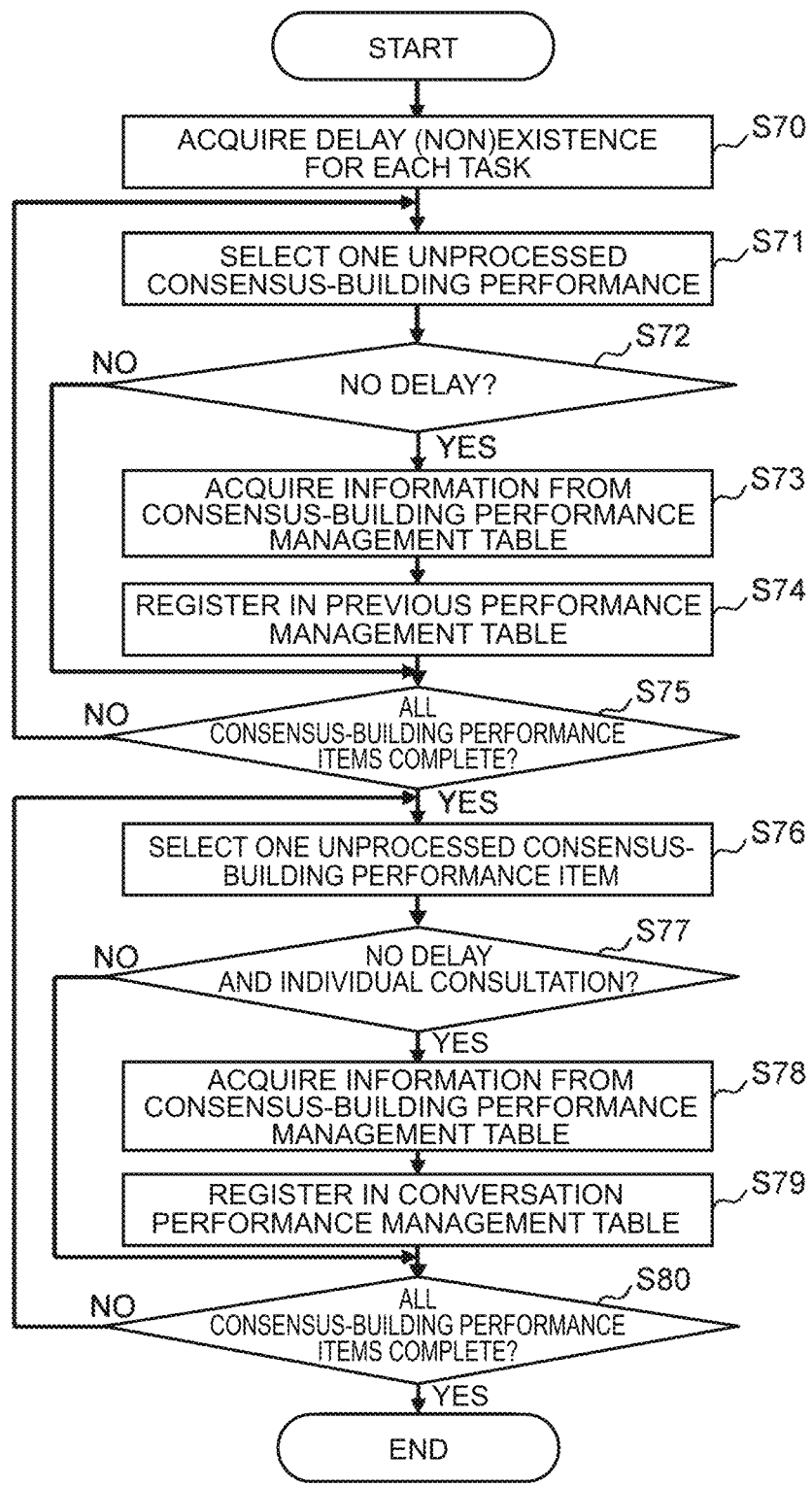
FIG. 26 is a flowchart showing the process steps of previous performance generation processing.

FIG. 26 shows the processing content of the previous performance generation processing that is executed by the previous performance generation unit 44 (FIG. 3) in connection with the consensus-building plan generation and management function according to this embodiment. The previous performance generation unit 44 registers information on the consensus-building performance items which have ended without delay to the consensus-building plan, from among the consensus-building items registered in the consensus-building performance management table 22 (FIG. 10), in the conversation performance management table 24 (FIG. 12) and the previous performance management table 25 (FIG. 13) according to the process steps shown in FIG. 26.

In reality, when the completion date of one operation is input via the operation performance input screen 110 (FIG. 20), the previous performance generation unit 44 determines whether one process has been completed by referring to the operation content management table 17 (FIG. 5) and, when it is determined that one process has been completed, starts the previous performance generation processing shown in FIG. 26.

Furthermore, the previous performance generation unit 44 foremost refers to the process performance management table 23 (FIG. 11) and acquires the (non)existence of a delay for each operation (the values of the delay (non)existence flag which is stored in the delay (non)existence field 23F of each row) in association with the operation IDs of the operations (S70).

Thereafter, the previous performance generation unit 44 selects one consensus-building performance item for which the processing of step S72 and subsequent steps is unprocessed from among the consensus-building performance items registered in the consensus-building performance management table 22 (FIG. 10) (S71) and determines whether there has not been a delay in all of the operations of the process for which the selected performance item has been executed (S72).

Specifically, in step S72, the previous performance generation unit 44 acquires the subject ID and operation ID which are stored in the subject ID field 22A (FIG. 10) and operation ID field 22B (FIG. 10) respectively of the row of the consensus-building task that was selected in step S71, and specifies the rows in which this subject ID is stored in the subject ID field 23A (FIG. 11) and this operation ID is stored in the operation ID field 23C (FIG. 11) among the rows of the process performance management table 23 (FIG. 11).

Moreover, the previous performance generation unit 44 specifies, among the rows of the process performance management table 23, all the rows in which the same subject ID and process name as the subject ID and process name stored in the subject ID field 23A and process field 23B of the rows which were specified as described hereinabove are stored in the subject ID field 23A and process field 23B respectively and determines whether the values of the delay (non) existence flags which are stored in the delay (non)existence field 23F (FIG. 11) of these rows are all '0.'

If a negative result is obtained in this determination, the previous performance generation unit 44 then advances to step S75. However, upon obtaining an affirmative result in the determination of step S72, the previous performance generation unit 44 acquires the information of the row corresponding to the consensus-building performance item which was selected in step S71 from among the rows of the consensus-building performance management table 22 (S73) and registers the acquired information in the previous performance management table 25 (FIG. 13) as the previous successful performance item (S74).

Specifically, the previous performance generation unit 44 acquires the subject ID which is stored in the subject ID field 22A (FIG. 10), the operation ID which is stored in the operation ID field 22B (FIG. 10), the date which is stored in the date field 22C (FIG. 10), the execution method which is stored in the execution method field 22F (FIG. 10) and the responsible party ID of the consensus-building target responsible party which is stored in the consensus-building target responsible party field 22G respectively in the row, corresponding to the consensus-building performance item which was selected in step S71, in the consensus-building performance management table 22.

Further, among this acquired information, the previous performance generation unit 44 registers the subject ID, operation ID, date, and execution method in the subject ID field 25A, operation ID field 25B, start date field 25C or execution method field 25D respectively of the previous performance management table 25. Moreover, the previous performance generation unit 44 acquires the role of the responsible party to which the responsible party ID has been assigned based on the responsible party ID acquired as described hereinabove, from the project responsible party management table 18, and stores the acquired role in the consensus-building target responsible party role field 25E of the previous performance management table 25.

Thereafter, the previous performance generation unit 44 determines whether execution of the processing of steps S72 to S74 has ended for all of the rows in the consensus-building performance management table 22 (S75). Further, upon obtaining a negative result in this determination, the previous performance generation unit 44 returns to step S71 and then repeats the processing of steps S71 to S75 while sequentially replacing the consensus-building performance item selected in step S71 with another unprocessed consensus-building performance item.

As a result of the repetitive processing of the foregoing steps S71 to S75, the consensus-building performance items, of each of the consensus-building tasks which have been executed in processes that have been completed without delay to the consensus-building plan among the processes that have been executed thus far, are all stored in the previous performance management table 25.

Thereafter, upon obtaining an affirmative result in step S75 as a result of finishing before long to execute the processing of steps S72 to S74 for all of the consensus-building performance items registered in the consensus-building performance management table 22, the previous performance generation unit 44 selects one consensus-building performance item for which the processing of step S72 and subsequent steps is unprocessed from among the consensus-building performance items registered in the consensus-building performance management table 22 (FIG. 10) (S76).

Further, the previous performance generation unit 44 determines whether the selected consensus-building performance item is a consensus-building performance item of an 'individual consultation' consensus-building task and whether there has not been a delay in all of the operations which the process in which the 'individual consultation' was executed comprises (S77).

If a negative result is obtained in this determination, the previous performance generation unit 44 then advances to step S80. However, upon obtaining an affirmative result in the determination of step S77, the previous performance generation unit 44 acquires the information of the row corresponding to the consensus-building performance item which was selected in step S76 from among the rows of the consensus-building performance management table 22 (S78) and registers the acquired information in the conversation performance management table 24 (FIG. 12) as the previous successful performance item (S79).

Specifically, the previous performance generation unit 44 acquires the subject ID which is stored in the subject ID field 22A (FIG. 10), the operation ID which is stored in the operation ID field 22B (FIG. 10), and the responsible party ID of the consensus-building target responsible party which is stored in the consensus-building target responsible party field 22G (FIG. 10), each of the ratios stored in the interaction time ratio field 22H (FIG. 10), speaker time ratio field 22I (FIG. 10) and listener time ratio field 22J (FIG. 10) respectively, and the start time and end time of the consensus-building task 'individual consultation' which are stored in the start time field 22D (FIG. 10) and end time field 22E (FIG. 10) respectively, in the row, in the consensus-building performance management table 22, which corresponds to the consensus-building performance item which was selected in step S76.

Further, among this acquired information, the previous performance generation unit 44 stores the subject ID, operation ID, and responsible party ID of the consensus-building target responsible party in the subject ID field 24A (FIG. 12), operation ID field 24B (FIG. 12), or consensus-building target responsible party field 24C (FIG. 12) respectively of the conversation performance management table 24. Further, the previous performance generation unit 44 stores the time ratios for which the conversation role of the project manager 46 at execution of the consensus-building task ('individual consultation') acquired as described hereinabove is 'interaction,' 'speaker,' and 'listener' in the interaction time ratio field 24D (FIG. 12), speaker time ratio field 24E (FIG. 12), and listener time ratio field 24F (FIG. 12) respectively of the conversation performance management table 24. Moreover, the previous performance generation unit 44 calculates the total time of the conversation that was conducted as the consensus-building task based on the start time and end time of the consensus-building task ('individual consultation') which were acquired in step S78, and stores the calculated total time in the total time field 24G (FIG. 12) of the conversation performance management table 24.

Thereafter, the previous performance generation unit 44 determines whether execution of the processing of steps S77 to S79 has ended for all of the rows in the consensus-building performance management table 22 (S80). Further, upon obtaining a negative result in this determination, the previous performance generation unit 44 returns to step S76 and then repeats the processing of steps S76 to S80 while sequentially replacing the consensus-building performance item selected in step S76 with another unprocessed consensus-building performance item.

As a result of the repetitive processing of the foregoing steps S76 to S80, the consensus-building performance items, of each of the 'individual consultations' which have been executed in processes that have been completed without delay to the consensus-building plan among the processes that have been executed thus far, are all stored in the conversation performance management table 24.

Further, upon obtaining an affirmative result in step S80 as a result of finishing before long to execute the processing of steps S77 to S79 for all of the consensus-building performance items registered in the consensus-building performance management table 22, the previous performance generation unit 44 ends the previous performance generation processing.

(4-5) Processing of Model Case Generation Unit

The specific processing content of the model case generation unit 45 (FIG. 3) will be explained next. The model case generation unit 45 executes model case generation processing which generates a model case that prescribes the execution times of each of the consensus-building tasks in each process based on the performance information of each of the consensus-building tasks that were executed without delay in the previous project registered in the previous performance management table 25.

The model case generation processing is configured from a first phase which extracts, for each process of each project type, a previous performance item that can serve as a model base in this process from the previous performance management table 25, and a second phase which calculates the execution times of each of the consensus-building tasks that are to be executed in the corresponding process based on the extracted previous performance item. In this embodiment, the progress ratio of the consensus-building task, described hereinabove with reference to FIG. 14, is calculated as the execution time of each consensus-building task in the second phase.

In reality, the model case generation unit 45 calculates the numbers of days required for each of the operations that the process comprises in the project of the previously executed project type, in each process of each project type, based on the performance information registered in the previous performance management table 25 (FIG. 13), as shown in FIG. 27, in the first phase.

Furthermore, the model case generation unit 45 calculates the number of days required to execute the whole process in the project based on this calculation result, and determines the previous performance item of the process in the project that was completed in the shortest time as the model case for the process of this project type.

Moreover, in the second phase, the model case generation unit 45 calculates, for each process of each project type, the progress ratio of each consensus-building task that was executed in the model case for the process in the project of this project type which was determined as described hereinabove, as shown in FIG. 28. This progress ratio is calculated by dividing the number of days that have elapsed since the start date of the process until the date when the consensus-building task was executed by the number of days required for the whole process.

Further, the model case generation unit 45 registers the progress ratio thus calculated in the model case management table 26 (FIG. 14) in association with the project type ID of the corresponding project type, the operation ID of the operation for which the corresponding consensus-building task is executed, the execution method of the consensus-building task, and the role of the consensus-building target responsible party of the consensus-building task, and the like. Thereupon, the model case generation unit 45 also registers, for a model case of an 'individual consultation' consensus-building task, the total time of the conversation that is conducted for the 'individual consultation' and the conversation role of the project manager 46 in the consensus-building task, in the model case management table 26.

Figure 29A:
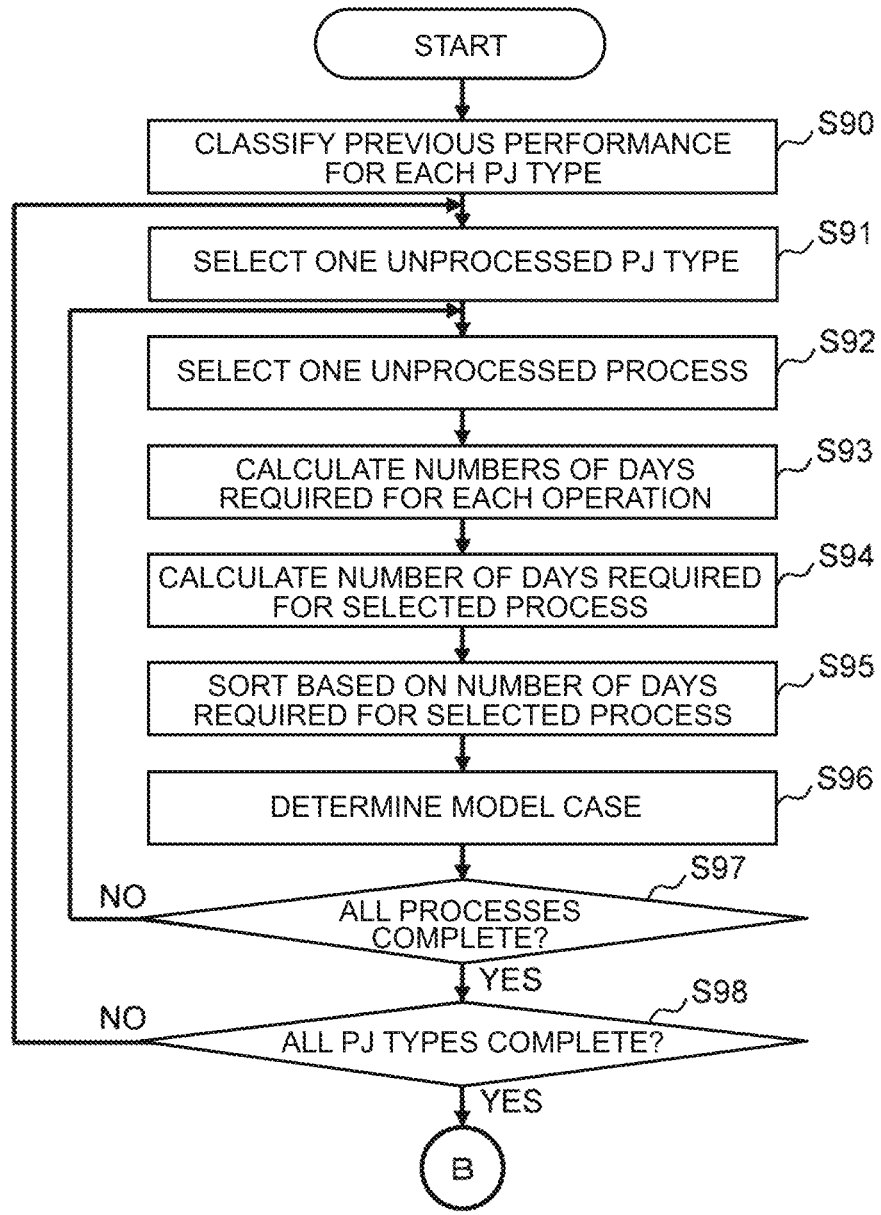
FIG. 29A is a flowchart showing the process steps of model case generation processing.

FIGS. 29A and 29B are flowcharts showing the process steps of serial processing of the model case generation unit 45 as described hereinabove (hereinafter called model case generation processing). The model case generation unit 45 determines the model case for each process of each project type according to the process steps shown in FIGS. 29A and 29B, and registers this information in the model case management table 26.

In reality, the model case generation unit 45 starts the model case generation processing on a regular basis and foremost categorizes each of the previous performance items registered in the previous performance management table 25 into project types (S90).

Specifically, the model case generation unit 45 acquires, for each row in the previous performance management table 25, the subject ID stored in the subject ID field 25A (FIG. 13) of the row and, by searching the project information management table 19 (FIG. 7) by using the acquired subject ID as the search key, specifies the project type of the project for which the previous performance item corresponding to that row was obtained. Furthermore, the model case generation unit 45 categorizes each of the previous performance items registered in the previous performance management table 25 into the project types of the projects for which the previous performance items were obtained, based on this specification result.

Thereafter, the model case generation unit 45 selects one project type for which step S92 and subsequent steps are unprocessed (S91) and selects one process for which step S93 and subsequent steps are unprocessed from among the processes which are executed in the project which belongs to the project type (S92). Note that the model case generation unit 45 specifies the processes which are executed in the project belonging to each project type by referring to the operation content management table 17 (FIG. 5).

Thereafter, the model case generation unit 45 extracts the previous performance items pertaining to the process selected in step S92 from among the previous performance items registered in the previous performance management table 25 and calculates the number of days required to execute each operation which the process comprises for each corresponding project as described hereinabove with reference to FIG. 27, based on the extracted previous performance items (S93).

Specifically, the model case generation unit 45 categorizes each of the previous performance items that belong to a group which corresponds to the project type selected in step S91 among groups of each project type of the previous performance items obtained in the processing of step S90, based on the subject ID stored in the subject ID field 25A (FIG. 13) of the row which corresponds to the previous performance item in the previous performance management table 25.

Moreover, the model case generation unit 45 extracts, in performance units and based on the operation IDs that are stored in the operation ID field 25B (FIG. 13), the previous performance items of the consensus-building tasks which were executed in the process selected in step S92 of the project, for each project, from the previous performance items of each project categorized as described hereinabove.

Further, the model case generation unit 45 calculates the number of days required for the operation for each corresponding operation based on the previous performance items in operation units which have been extracted as described hereinabove. In this case, the number of days required for the operation is calculated as the number of days from the start date of the consensus-building task which was executed first in the operation until the start date of the consensus-building task which was executed last in the operation.

For example, in the case of the operation to which the operation ID 'W01' has been assigned in FIG. 13, it can be seen that the consensus-building task which was executed last in the operation is a consensus-building task for which 'email' has been executed as the execution method for a consensus-building target responsible party whose role is 'analysis' on '2017/11/01' or a consensus-building task for which an 'individual consultation' has been conducted as the execution method for the consensus-building target responsible party whose role is 'equipment provision' on the same date, and therefore the number of days required for the operation is calculated as two days from '2017/11/01' until '2017/11/02.'

Thereafter, the model case generation unit 45 finds the sum total of the numbers of days for each operation that were calculated in step S93 and calculates this sum total as the number of days required to execute the process selected in step S92, for each corresponding project (S94). Furthermore, the model case generation unit 45 then places the corresponding projects in order starting with the project with the smallest number of days based on the number of days for each corresponding project thus calculated (S95).

Furthermore, the model case generation unit 45 determines the previous performance item of the process of the project with the smallest number of days required to execute the process (the process selected in step S92) from among the projects which have been placed in order in this way, as the model case for this process (S96).

Thereafter, the model case generation unit 45 determines whether execution of the processing of step S93 and subsequent steps has ended for all of the processes which are executed in the project of the project type selected in step S91 (S97).

Upon obtaining a negative result in this determination, the model case generation unit 45 then returns to step S92 and repeats the processing of steps S92 to S97 while sequentially replacing the process selected in step S92 with another unprocessed process.

Furthermore, upon obtaining an affirmative result in step S97 as a result of finishing before long to determine each of the previous performance items which are to serve as model cases, for all the processes which are executed in the project of the project type selected in step S91, the model case generation unit 45 determines whether execution of the processing of step S92 and subsequent steps has ended for all of the project types.

Upon obtaining a negative result in this determination, the model case generation unit 45 then returns to step S91 and repeats the processing of steps S91 to S98 while sequentially replacing the project type selected in step S91 with another unprocessed project type.

Furthermore, upon obtaining an affirmative result in step S98 as a result of finishing before long to determine each of the previous performance items which are to serve as model cases, for all the processes of all project types, the model case generation unit 45 selects one model case from among the model cases of each process of each project type determined as described hereinabove (S99).

Thereafter, the model case generation unit 45 extracts all of the corresponding consensus-building performance items which correspond to each row in which the subject ID of the model case selected in step S99 has been stored in the subject ID field 22A (FIG. 10) from among the consensus-building performance items registered in the consensus-building performance management table 22 (FIG. 10) (S100) and selects one consensus-building performance item from among the extracted consensus-building performance items (S101).

The model case generation unit 45 then calculates the progress ratio of the consensus-building task in the process for which the consensus-building task corresponding to the consensus-building performance item selected in step S101 was executed (S102). Specifically, the model case generation unit 45 acquires the execution date of the consensus-building task corresponding to the consensus-building performance item selected in step S101 from the consensus-building performance management table 22, acquires the start date of the process for which this consensus-building task was executed from the process performance management table 23 (FIG. 11), and calculates the progress ratio by dividing a subtraction result obtained by subtracting the start date of the process from the execution date of the consensus-building task by the number of days in the whole process.

Moreover, the model case generation unit 45 secures one unprocessed row in the model case management table 26 (FIG. 14) and registers information relating to the consensus-building task which corresponds to the consensus-building performance item selected in step S101 in this row (S103).

Specifically, the model case generation unit 45 stores the project type ID of the project, for which the process corresponding to the model case selected in step S99 is executed, in the project type ID field 26A (FIG. 14) in this row. Furthermore, the model case generation unit 45 stores the operation ID, execution method, and role of the consensus-building target responsible party which have been registered in the consensus-building performance management table 22 (FIG. 10) for the consensus-building performance item selected in step S101 in the operation ID field 26B (FIG. 14), execution method field 26D (FIG. 14), or consensus-building target responsible party role field 26E (FIG. 14) respectively in this row. Moreover, the model case generation unit 45 stores the progress ratio calculated in step S102 in the progress ratio field 26C (FIG. 14) in this row.

Furthermore, the model case generation unit 45 determines whether execution of the processing of steps S102 to S103 has ended for all of the consensus-building performance items extracted in step S100 (S104).

Upon obtaining a negative result in this determination, the model case generation unit 45 returns to step S101 and then repeats the processing of steps S101 to S104 while sequentially replacing the consensus-building performance item selected in step S101 with another corresponding consensus-building performance item for which step S102 and subsequent steps are unprocessed.

Furthermore, upon obtaining an affirmative result in step S104 as a result of finishing before long to calculate each of the progress ratios of the corresponding consensus-building tasks, for all the consensus-building performance items which were extracted in step S100, the model case generation unit 45 determines whether execution of the processing of steps S100 to S104 has ended for the model cases of all of the processes of all project types (S105).

Upon obtaining a negative result in this determination, the model case generation unit 45 returns to step S99 and then repeats the processing of steps S99 to S105 while sequentially replacing the model case selected in step S99 with the model case of another unprocessed process.

Furthermore, upon obtaining an affirmative result in step S105 as a result of finishing before long to execute the processing of steps S100 to S104 for the model cases of all the processes of all project types, the model case generation unit 45 refers to the model case management table 26 (FIG. 14) that has been created thus far, and selects one model case which includes an 'individual consultation' as the consensus-building task (S106).

Thereafter, the model case generation unit 45 selects one consensus-building task from among the 'individual consultation' consensus-building tasks included in the model case (S107), refers to the conversation performance management table 24 (FIG. 12), and acquires the time ratios of each conversation role (interaction, speaker, and listener) of the project manager 46 when the selected consensus-building task ('individual consultation') was actually conducted, and the total time of the conversation conducted in the consensus-building task (S108).

Specifically, the model case generation unit 45 reads the subject ID which is stored in the subject ID field 25A in the row corresponding to the consensus-building task ('individual consultation') selected in step S106, the operation ID which is stored in the operation ID field 25B in this row, and the role of the consensus-building target responsible party which is stored in the consensus-building target responsible party role field 25E in this row, from among the rows in the previous performance management table 25 (FIG. 13). Further, the model case generation unit 45 refers to the project information management table 19 (FIG. 7) based on the role of the consensus-building target responsible party thus read, and acquires the responsible party ID of the responsible party to which the role of the consensus-building target responsible party has been assigned, in the process for which the consensus-building task was executed in the project for which the consensus-building task was executed.

Moreover, the model case generation unit 45 specifies the row, from among the rows of the conversation performance management table 24 (FIG. 12), in which the subject ID, operation ID, and responsible party ID acquired as described hereinabove are stored in the subject ID field 24A (FIG. 12), the operation ID field 24B (FIG. 12), or the consensus-building target responsible party field 24C (FIG. 12) respectively, and acquires the time ratios of the corresponding conversation roles which are stored in the interaction time ratio field 24D (FIG. 12), speaker time ratio field 24E (FIG. 12) and listener time ratio field 24F (FIG. 12) respectively in this row, and the total time which is stored in the total time field 24G (FIG. 12) in this row.

Thereafter, the model case generation unit 45 specifies the conversation role with the largest time ratio from among the time ratios of each of the conversation roles interaction, speaker and listener that were acquired as described hereinabove, as the conversation role of the project manager 46 in the consensus-building task ('individual consultation') of the model case (S109).

Thereafter, the model case generation unit 45 stores the conversation role that was specified in step S109 in the conversation role field 26G (FIG. 14) in the row which corresponds to the consensus-building task ('individual consultation') that was selected in step S107 in the model case management table 26 (FIG. 14), and stores the total time that was acquired in step S108 in the conversation time field 26F (FIG. 14) in this row (S110).

Thereafter, the model case generation unit 45 determines whether execution of the processing of step S107 and subsequent steps has ended for all of the 'individual consultation' consensus-building tasks which are executed in the model case that was selected in step S106 (S111).

Furthermore, upon obtaining a negative result in this determination, the model case generation unit 45 returns to step S107 and then repeats the processing of steps S107 to S111 while sequentially replacing the 'individual consultation' consensus-building task selected in step S107 with another unprocessed consensus-building task ('individual consultation').

Moreover, upon obtaining an affirmative result in step S111 as a result of finishing before long to execute the processing of steps S107 to S110 for all the 'individual consultation' consensus-building tasks which are executed in the model case selected in step S106, the model case generation unit 45 determines whether execution of the processing of step S107 and subsequent steps has ended for all the model cases.

Moreover, upon obtaining a negative result in this determination, the model case generation unit 45 returns to step S106 and then repeats the processing of steps S106 to S112 while sequentially replacing the model case selected in step S106 with another unprocessed consensus-building task.

Further, upon obtaining an affirmative result in step S112 as a result of finishing before long to execute the processing of steps S107 to S111 for all of the model cases, the model case generation unit 45 ends the model case generation processing.

(5) Effect of this Embodiment

As explained in the foregoing, in the project support system 1 according to this embodiment, the project support apparatus 2 generates a consensus-building plan which prescribes a consensus-building target responsible party, an execution time, and an execution method for each consensus-building task which the project manager 46 is to execute in this project, based on the performance of projects that have previously succeeded and project information on the current project that is input by the project manager 46 by using the project information input screen 50.

Thereupon, the project support apparatus 2 generates, for a consensus-building task ('individual consultation') which is referred to as 'background work,' a consensus-building plan which prescribes, in addition to the consensus-building target responsible party and execution time, the optimal conversation format (conversation time and conversation role of the project manager 46) at execution of the consensus-building task, based on the performance of projects that have previously succeeded.

Accordingly, according to the project support system 1, a consensus-building plan for a consensus-building task which the project manager 46 is to execute and which includes 'background work' can be provided and thus a project can be supported to run more smoothly.

(6) Other Embodiments

Note that, although a case in which the project support apparatus 2 generates and manages a consensus-building plan which prescribes a schedule and the like for consensus-building tasks which the project manager 46 is to execute was described in the foregoing embodiment, the present invention is not limited to or by such a case, rather, the project support apparatus 2 may generate and manage a consensus-building plan for consensus-building tasks which a project responsible party other than the project manager 46 is to execute in addition to or instead of the project manager 46, and may present the consensus-building plan to the responsible party.

Moreover, although a case where the wearable sensor device 3 has a business card shape and is configured as shown in FIG. 2 was described in the foregoing embodiment, the present invention is not limited to or by such a case, rather, a variety of other configurations can be widely applied as configurations of the wearable sensor device 3.

Moreover, although a case was described in the foregoing embodiment in which the time ratios of each conversation role ('interaction,' 'speaker,' or 'listener') of the project manager 46 relative to the whole conversation when the 'individual consultation' is executed by using the wearable sensor device 3 are each calculated, the present invention is not limited to or by such a case, rather, the outputs of the triple-axis acceleration sensor 30, infrared send/receive unit 31, and timer unit 32 may be associated and stored in the data storage unit 34 in the wearable sensor device 3, and the respective time zones of the conversation roles of the project manager 46 relative to the whole conversation when executing the 'individual consultation' may be calculated in the project support apparatus 2 based on this information, for example.

Moreover, although a case where model cases are generated in project process units was described in the foregoing embodiment, the present invention is not limited to or by such a case, rather, model cases may be generated in predetermined units other than processes (consensus-building task units, for example).

Moreover, although a case where the screen configurations of each of the screens are as shown in FIGS. 15 to 20 was described in the foregoing embodiment, the present invention is not limited to or by such a case, rather, a variety of other screen configurations can be widely applied.

Furthermore, although a case was described in the foregoing embodiment in which, in the rescheduling processing described hereinabove with respect to FIG. 25, when the number of days remaining of the corresponding operation is 50% or more of the planned execution period of the operation, the rescheduling unit 43 recreates (reschedules) the consensus-building plan by lowering the execution difficulty level of all the consensus-building tasks, the present invention is not limited to or by such a case, rather, the consensus-building plan may be recreated by lowering the execution difficulty level of a portion of the consensus-building tasks. Moreover, the threshold at this time may also be a value other than 50%.

Moreover, although a case was described in the foregoing embodiment in which the conversation role of the project manager 46 which is prescribed in the consensus-building plan is displayed in the plan display field 100A of the background work performance display screen 100 described hereinabove with reference to FIG. 19, the present invention is not limited to or by such a case, rather, the ideal time zones for each of the conversation roles (interaction, speaker and listener) of the project manager 46 when executing the corresponding background work could also be displayed.

The present invention can be widely applied to a project support apparatus which supports the execution of various projects.

What is claimed is:

1. A project support system which supports the execution of a project, comprising:
   a model case generation unit which generates, for each of predetermined units that the project comprises, a model case which prescribes a target for each consensus-building task, and an ideal execution time and execution method for each of the consensus-building tasks, based on the performance of each consensus-building task executed in a previous project;
   a project generation unit which generates a consensus-building plan which prescribes, for each of the predetermined units, a target, an execution time and an execution method for each of the consensus-building tasks which are to be executed in a current project, based on information of the current project which is input and the corresponding model case;
   a display unit which displays the consensus-building plan that has been generated by the project generation unit; and
   a wearable sensor device which responsible parties of the project each wear,
   wherein the consensus-building task includes background work in which the execution method is an informal face-to-face conversation,
   wherein, in the model case, an optimal conversation format when executing the background work is prescribed in addition to the target and ideal execution time for the background work,
   wherein, when the background work is included in the consensus-building task which is to be executed in the current project, the project generation unit generates the consensus-building plan which includes the conversation format at execution of the background work in addition to the target and execution time for the background work, and
   wherein, the wearable sensor device comprises:
   a triple-axis acceleration sensor which detects a frequency of movement of a wearer, an infrared send/receive unit which, when the wearer of an own wearable sensor device is facing a wearer of another wearable sensor device, performs infrared communication with the other wearable sensor device and mutually and intermittently exchanges identification information of the wearer of the own wearable sensor device; and
   an information acquisition unit which determines whether the wearer of the own wearable sensor device is conversing face-to-face with the wearer of the other wearable sensor device based on a detection result of the triple-axis acceleration sensor and a send/receive result of the infrared send/receive unit.

2. The project support system according to claim 1,
   wherein the conversation format includes a conversation time at execution of the background work and a conversation role for a user conducting the background work,
   wherein the conversation role includes a first role in which the user is mainly a speaker who speaks continuously to the target of the background work, a second role in which the user is a listener who listens continuously to the background work target speaking, and a third role in which the user and the background work target both speak, and
   wherein, when the background work is included in the consensus-building task which is to be executed in the current project, the project generation unit generates the consensus-building plan in which any one of the first to third roles is designated as the conversation role of the user at execution of the background work.

3. The project support system according to claim 2, further comprising:
   when the information acquisition unit determines that the wearer of the own wearable sensor device is conversing face-to-face with the wearer of the other wearable sensor device, the information acquisition unit acquires a conversation time which is an intermittent time of the conversation, and time ratios in which the conversation role of the wearer of the own wearable sensor device in the conversation is the first to third roles,
   wherein the model case generation unit generates the model case which prescribes the optimal conversation format at execution of the background work when the consensus-building task is the background work based on the conversation time and the time ratios in which the conversation role of the wearer of the own wearable sensor device at the conversation is the first to third roles, which have been acquired by the information acquisition unit.

4. The project support system according to claim 1, further comprising:
   a rescheduling unit which recreates the consensus-building plan; and
   a progress management unit which manages progress of the consensus-building task relative to the consensus-building plan of the current project and, when the progress of the consensus-building task relative to the consensus-building plan is delayed, issues a request to the rescheduling unit to reschedule the consensus-building plan,
   wherein at least a portion of the consensus-building tasks can be executed by a plurality of the execution methods,
   wherein an execution difficulty level representing the difficulty level when executing the corresponding consensus-building task is configured for each of the execution methods, and
   wherein the rescheduling unit recreates a new consensus-building plan in which the execution difficulty level of the execution method of all or a portion of incomplete consensus-building tasks is reduced.

5. The project support system according to claim 4,
wherein, when a number of remaining days of a corresponding operation which is prescribed in the consensus-building plan is at or above a preconfigured threshold, the rescheduling unit recreates the new consensus-building plan in which the execution difficulty level of the execution method of all or a portion of incomplete consensus-building tasks is reduced, according to the number of remaining days and, when the number of remaining days is less than the threshold, the rescheduling unit issues a request to the user to reconfigure an operation period.

6. A project support method which is executed in a project support system that supports the execution of a project, comprising:
a first step of generating, for each of predetermined units that the project comprises, a model case which prescribes a target for each consensus-building task, and an ideal execution time and execution method for each of the consensus-building tasks, based on the performance of each consensus-building task executed in a previous project;
a second step of generating a consensus-building plan which prescribes, for each of the predetermined units, a target, an execution time and an execution method for each of the consensus-building tasks which are to be executed in a current project, based on information of the current project which is input and the corresponding model case;
a third step of displaying the consensus-building plan that has been generated; and
a wearable sensor device which responsible parties of the project each wear,
wherein the consensus-building task includes background work in which the execution method is an informal face-to-face conversation,
wherein, in the model case, an optimal conversation format at execution of the background work is prescribed in addition to the target and ideal execution time for the background work,
wherein, in the second step, when the background work is included in the consensus-building task which is to be executed in the current project, the consensus-building plan which includes the conversation format at execution of the background work in addition to the target and execution time for the background work is generated, and
wherein, the wearable sensor device comprises,
a triple-axis acceleration sensor which detects a frequency of movement of a wearer, an infrared send/receive unit which, when the wearer of an own wearable sensor device is facing a wearer of another wearable sensor device, performs infrared communication with the other wearable sensor device and mutually and intermittently exchanges identification information of the wearer of the own wearable sensor device; and
an information acquisition unit which determines whether the wearer of the own wearable sensor device is conversing face-to-face with the wearer of the other wearable sensor device based on a detection result of the triple-axis acceleration sensor and a send/receive result of the infrared send/receive unit.

7. The project support method according to claim 6,
wherein the conversation format includes a conversation time at execution of the background work and a conversation role for a user conducting the background work,
wherein the conversation role includes a first role in which the user is mainly a speaker who speaks continuously to the target of the background work, a second role in which the user is a listener who listens continuously to the background work target speaking, and a third role in which the user and the background work target both speak, and
wherein, in the second step, when the background work is included in the consensus-building task which is to be executed in the current project, the consensus-building plan in which any one of the first to third roles is designated as the conversation role of the user at execution of the background work is generated.

8. The project support method according to claim 7, further including:
when it is determined that the wearer of the own wearable sensor device is conversing face-to-face with the wearer of the other wearable sensor device, acquiring a conversation time which is an intermittent time of the conversation, and time ratios in which the conversation role of the wearer of the own wearable sensor device in the conversation is the first to third roles,
wherein, in the first step, the project support system generates the model case which prescribes the optimal conversation format at execution of the background work when the consensus-building task is the background work based on the conversation time and the time ratios in which the conversation role of the wearer of the own wearable sensor device at the conversation is the first to third roles, which have been acquired by the information acquisition unit.

9. The project support method according to claim 6, further comprising:
a fourth step of managing progress of the consensus-building task relative to the consensus-building plan of the current project; and
a fifth step of recreating the consensus-building plan when the progress of the consensus-building task relative to the consensus-building plan is delayed,
wherein at least a portion of the consensus-building tasks can be executed by a plurality of the execution method,
wherein an execution difficulty level representing the difficulty level when executing the corresponding consensus-building task is configured for each of the execution methods, and
wherein, in the fifth step, a new consensus-building plan in which the execution difficulty level of the execution method of all or a portion of incomplete consensus-building tasks is reduced is recreated.

10. The project support method according to claim 9,
wherein, in the fifth step, when a number of remaining days of a corresponding operation which is prescribed in the consensus-building plan is at or above a preconfigured threshold, the new consensus-building plan in which the execution difficulty level of the execution method of all or a portion of incomplete consensus-building tasks is reduced is recreated according to the number of remaining days and, when the number of remaining days is less than the threshold, a request is issued to the user to reconfigure an operation period.

* * * * *